AUTOMATIC ELECTRONIC SIGNAL KEYER

Filed Sept. 23, 1957 8 Sheets-Sheet 1

INVENTORS
THEODORE S. SPITZ
CHARLES F. ZAHNER
RALPH L. SAMSON
BY
Norbert Ederer
THEIR ATTORNEY INVENTORS
THEODORE S. SPITZ
CHARLES F. ZAHNER
RALPH L. SAMSON
BY Norbert Ederer
THEIR ATTORNEY

AUTOMATIC ELECTRONIC SIGNAL KEYER

Filed Sept. 23, 1957 8 Sheets-Sheet 3

INVENTORS
THEODORE S. SPITZ
CHARLES F. ZAHNER
RALPH L. SAMSON
BY Norbert Ederer
THEIR ATTORNEY INVENTORS
THEODORE S. SPITZ
CHARLES F. ZAHNER
RALPH L. SAMSON
BY Norbert Ederer
THEIR ATTORNEY Feb. 13, 1962 T. S. SPITZ ET AL 3,021,516

AUTOMATIC ELECTRONIC SIGNAL KEYER

Filed Sept. 23, 1957 8 Sheets-Sheet 5

INVENTORS
THEODORE S. SPITZ
CHARLES F. ZAHNER
RALPH L. SAMSON
BY
Norbert Ederer
THEIR ATTORNEY INVENTORS
THEODORE S. SPITZ
CHARLES F. ZAHNER
RALPH L. SAMSON
BY Norbert Edera
THEIR ATTORNEY Feb. 13, 1962 T. S. SPITZ ET AL 3,021,516

AUTOMATIC ELECTRONIC SIGNAL KEYER

Filed Sept. 23, 1957

8 Sheets-Sheet 7

INVENTORS
THEODORE S. SPITZ
CHARLES F. ZAHNER
RALPH L. SAMSON

BY Norbert Ederer

THEIR ATTORNEY

Feb. 13, 1962 T. S. SPITZ ET AL 3,021,516

AUTOMATIC ELECTRONIC SIGNAL KEYER

Filed Sept. 23, 1957 8 Sheets-Sheet 8

INVENTORS
THEODORE S. SPITZ
CHARLES F. ZAHNER
RALPH L. SAMSON

BY Norbert Edeer

THEIR ATTORNEY 3,021,516

AUTOMATIC ELECTRONIC SIGNAL KEYER

Theodore S. Spitz, Bronx, N.Y., and Charles F. Zahner, Clifton, and Ralph L. Samson, Wyckoff, N.J., assignors to Curtiss-Wright Corporation, a corporation of Delaware Filed Sept. 23, 1957, Ser. No. 685,492
20 Claims. (Cl. 340—345)

This invention relates to simulated radio navigational aids in aircraft trainers and more particularly to keying apparatus for keying the simulated radio transmitter signal with the identification call-letters of the simulated radio station.

Various types of radio navigational aid systems are employed in actual air traffic and have been incorporated in flight simulating apparatus for the training of student pilots. Such systems include the very high frequency omni-range (VOR) system and the instrument landing system (ILS), either of which may be provided to transmit distance measuring equipment (DME) aid to the pilot. Additionally the low frequency AN range transmission system has been employed for navigational aid purposes. These systems generally employ radio transmission of aural or visual navigation aid signals to the pilot. From time to time the transmission may be interrupted and the station is identified by transmission of its identification call-letters. The identification signal is transmitted in the form of a 1020 c.p.s. audio tone keyed on and off in accordance with the Morse code representation of the call-letters.

Generally a station-identification call-letter sequence is composed of two or three call-letters. In the case of marker or beacon (MARK) transmission one letter sequences may be employed. Four letter sequences presently are employed only in some Europeans countries. In the United States four-letter-sequences are employed at present for the limited purpose of ILS transmission wherein the letter I is transmitted in Morse code preceding the regular sequence of station-identification call-letters. The keyer hereinafter described includes means to produce sequences of from one to four letters, allowing for future use of four letter sequences in the United States as well as permitting present use in European countries. The keyer is equipped also to transmit ILS signals. In such case the interval of silence, which begins at the end of the second dot of the letter I and ends with the beginning of the initial letter in the station-identification sequence proper, is of five units of time in duration instead of the usual three units of time separating the letters in the sequence.

The keyer is also equipped to simulate operation of a radio station transmitting DME aid signals, in which case a continuous 1020 c.p.s. audio tone is transmitted intermediate of short silence intervals following the termination of one sequence of call-letters and preceding the next such sequence.

It is a principal object of the invention to provide an improved universal keyer which is settable to generate call-letters sequences including from one to four letters inclusive according to any desired combination of call-letters.

Another object of the invention is to provide an all-purpose electronic keyer capable of generating the station-identification and other aid signals for VOR, ILS, DME, MARK and AN range operation.

For purposes of the invention the Morse code letters are grouped into intelligence characters and space characters. The former include dots and dashes whereas the latter include short spaces separating the intelligence characters within a letter and the long spaces which separate the letters from one another. The basic unit of time are the equal durations of a dot or a short space, approximately 0.1 second. The dashes and long spaces have a duration of three units of time. As is well-known Morse code letters are composed of from one to four intelligence characters. For purposes of the invention the letters may also be regarded as composed of character counts. Each letter is composed of a number of character counts equal to the number of its intelligence characters plus 2. The intelligence character counts commence coinitially with the corresponding intelligence characters but terminate one unit of time thereafter.

Thus the counts generally embrace the period of the associated intelligence characters and the short spaces thereafter. This definition is not strictly applicable to the last of the intelligence character counts which is followed by a long space three units of time in duration, and therefore the previous definition of duration of the corresponding intelligence character plus 1 unit of time must be applied thereto. The remainder of the time allocation for a given letter is allotted to a long space count and a reset count. The long space count commences at the termination of the last intelligence character count and is of a duration greater than one unit of time but less than two units of time. The reset count occupies the time interval from the termination of the long space count to the first count of the next letter. Thus a given letter for purposes of the invention is regarded as commencing with the beginning of its initial intelligence character and terminating with the end of the inter-letter long space following its last intelligence character. In certain instances hereinafter the reset count is alternatively regarded as allocated to the next letter and therefore constitutes the count 0 of such next letter rather than the last count of the preceding letter. This will be apparent from the context.

In order that the detailed nature of the invention may be clearly understood, reference is made to the following description considered together with the accompanying drawings in which—

Figure 1:
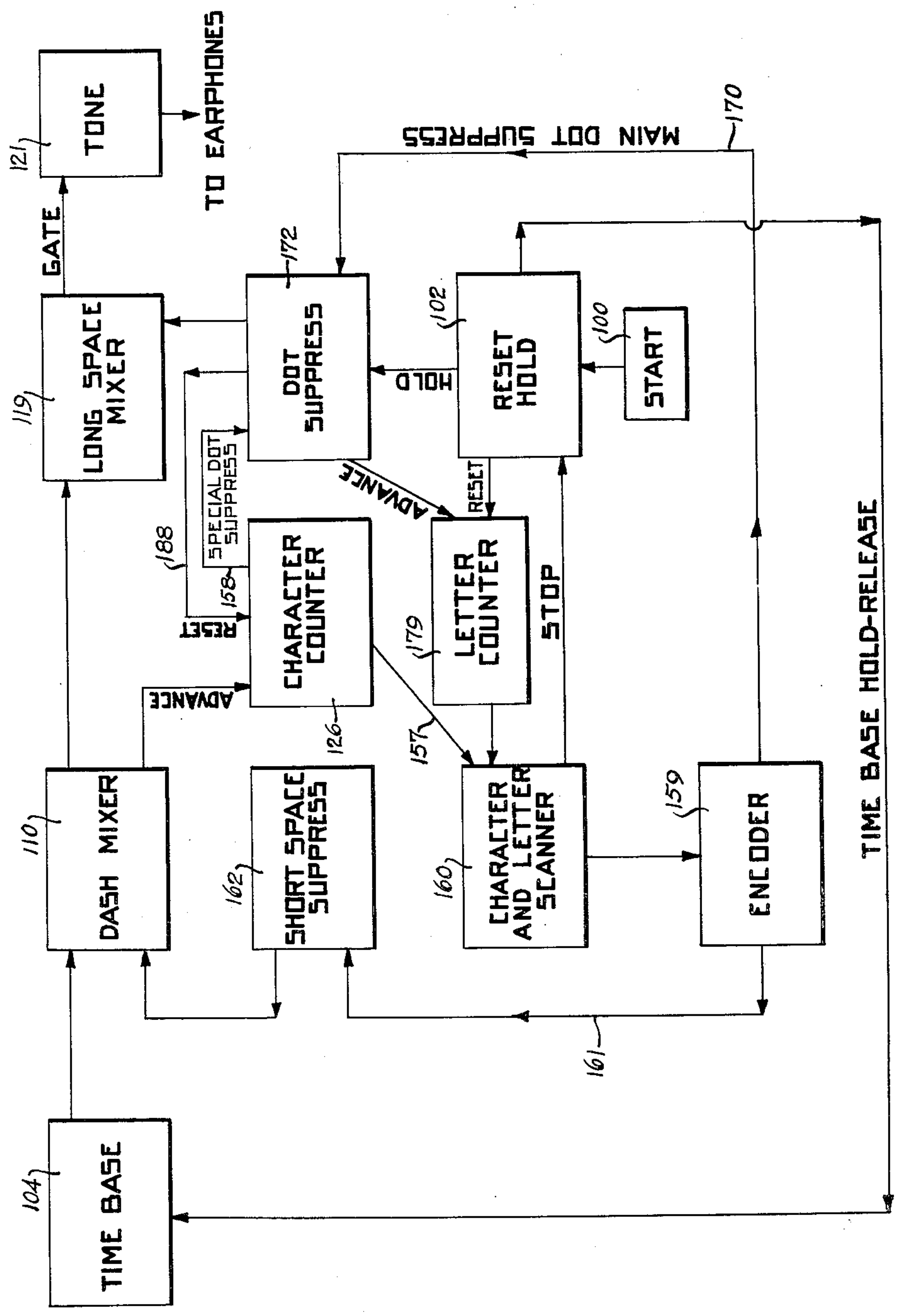
FIG. 1 is a simplified block diagram of the automatic electronic keyer in accordance with a preferred embodiment of the invention.
Figure 4:
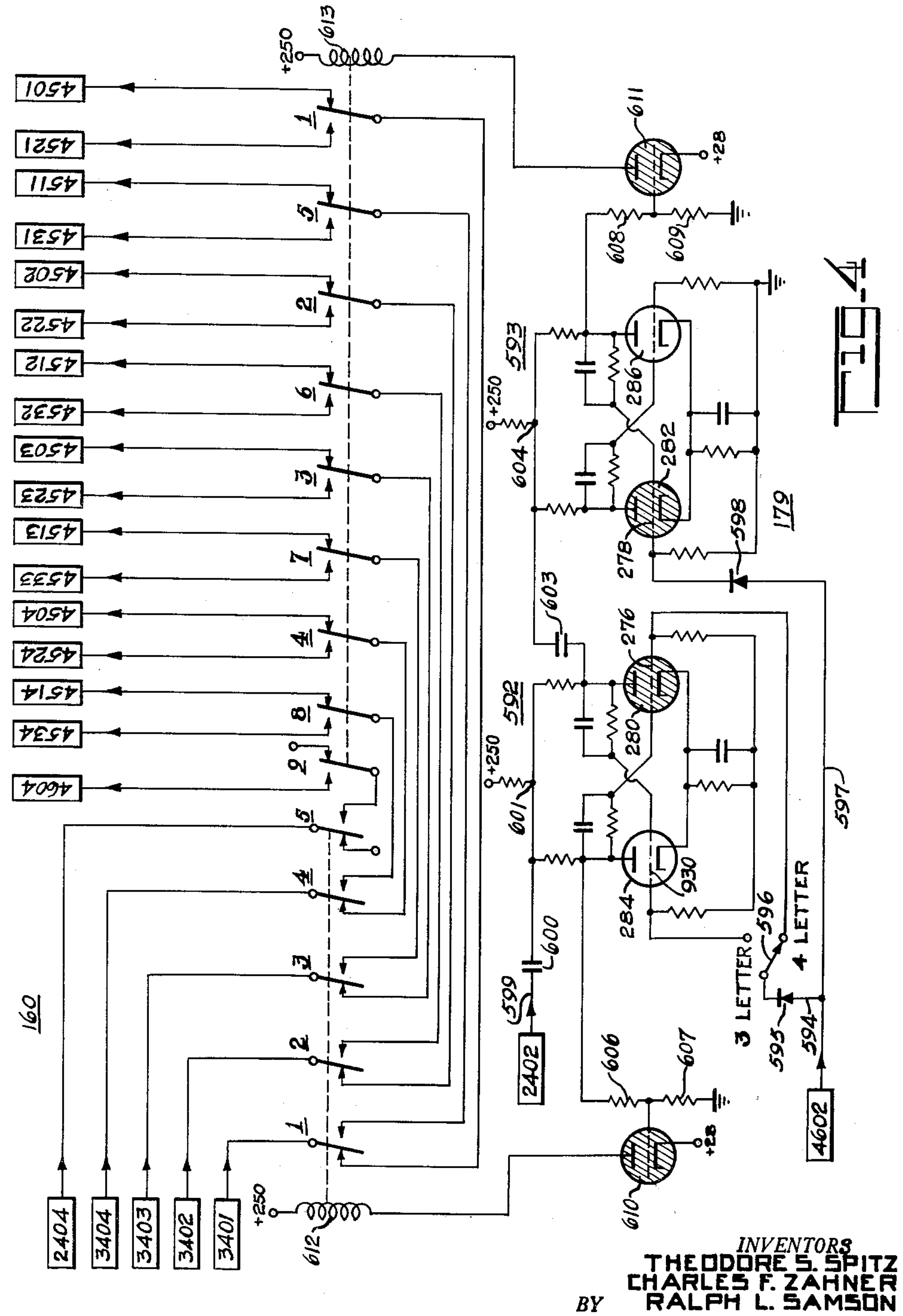
FIG. 4 is a schematic drawing of another portion of the apparatus indicated in FIG. 1 and includes circuitry for counting the letters in the sequence.
Figure 5:
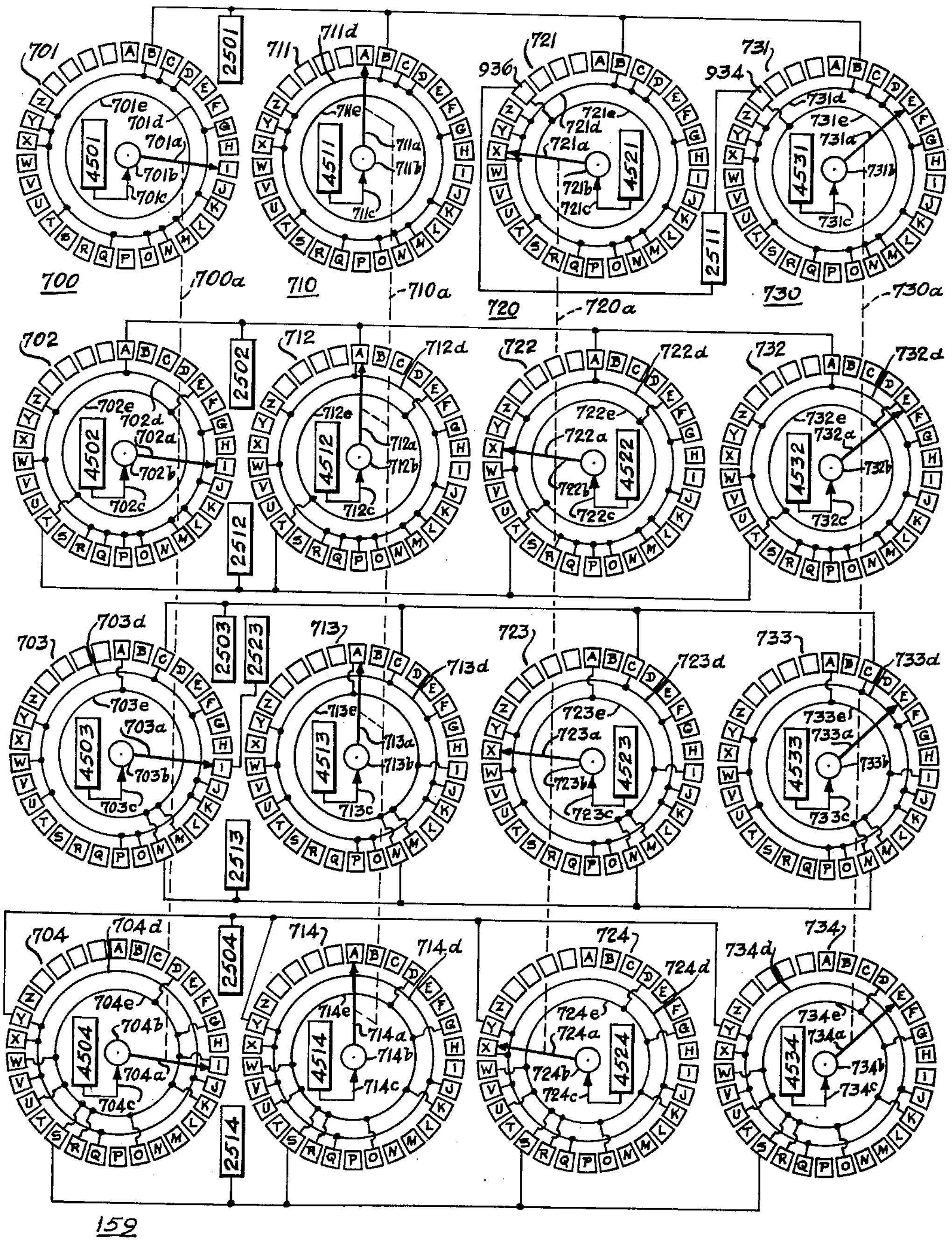
FIG. 5 is a schematic drawing illustrating another portion of the apparatus indicated in FIG. 1 and includes the encoder or memory unit for storing the letters and characters in the sequence.
Figure 6:
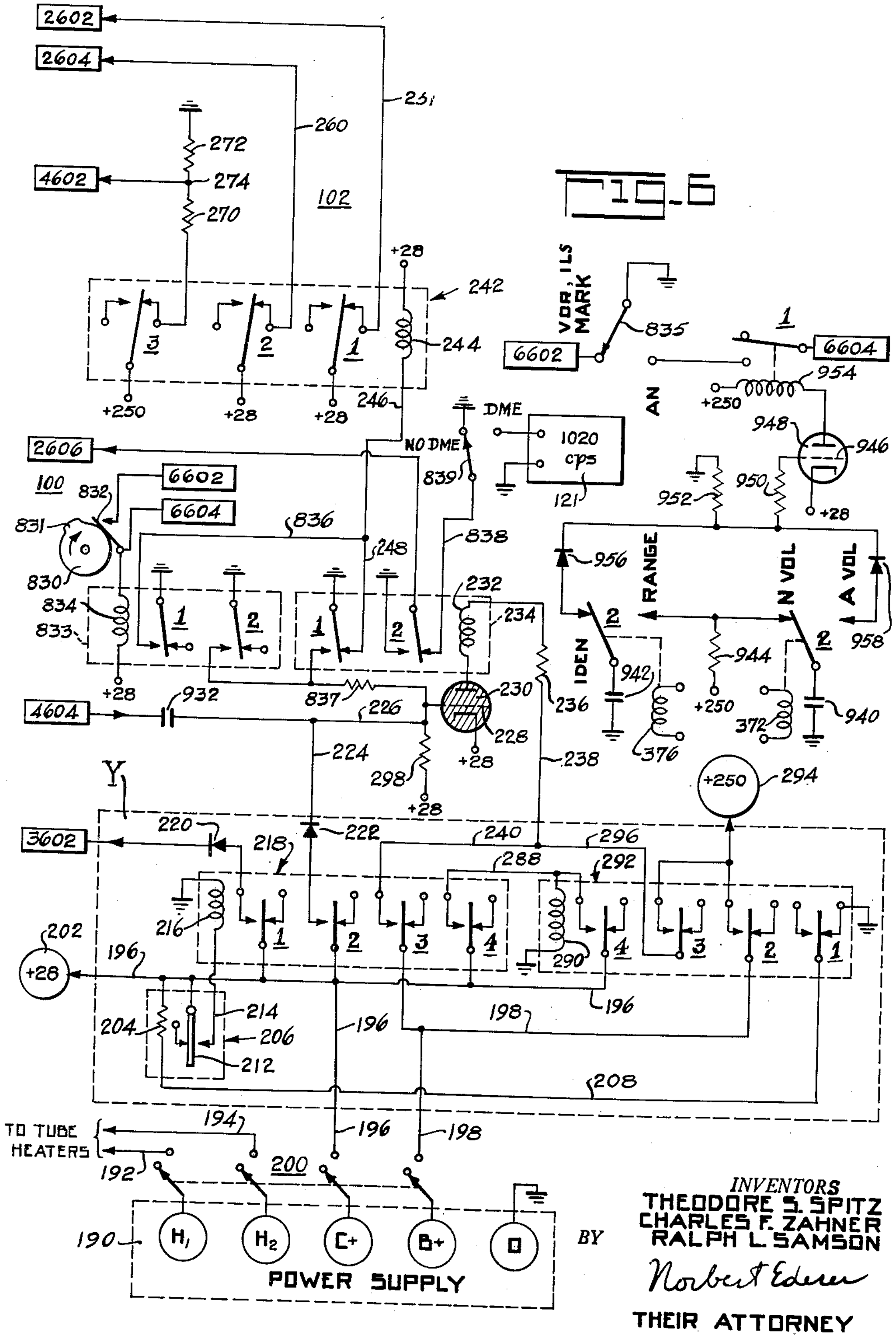
Figure 7:
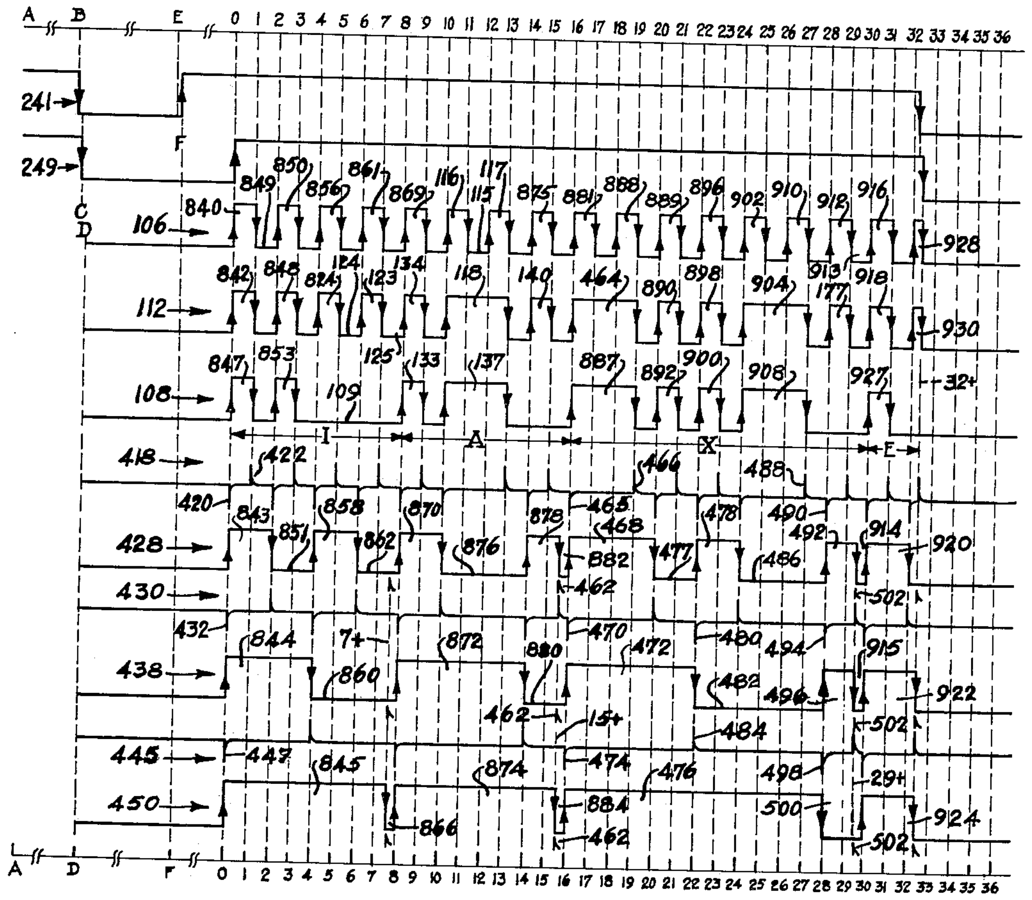
Figure 8:
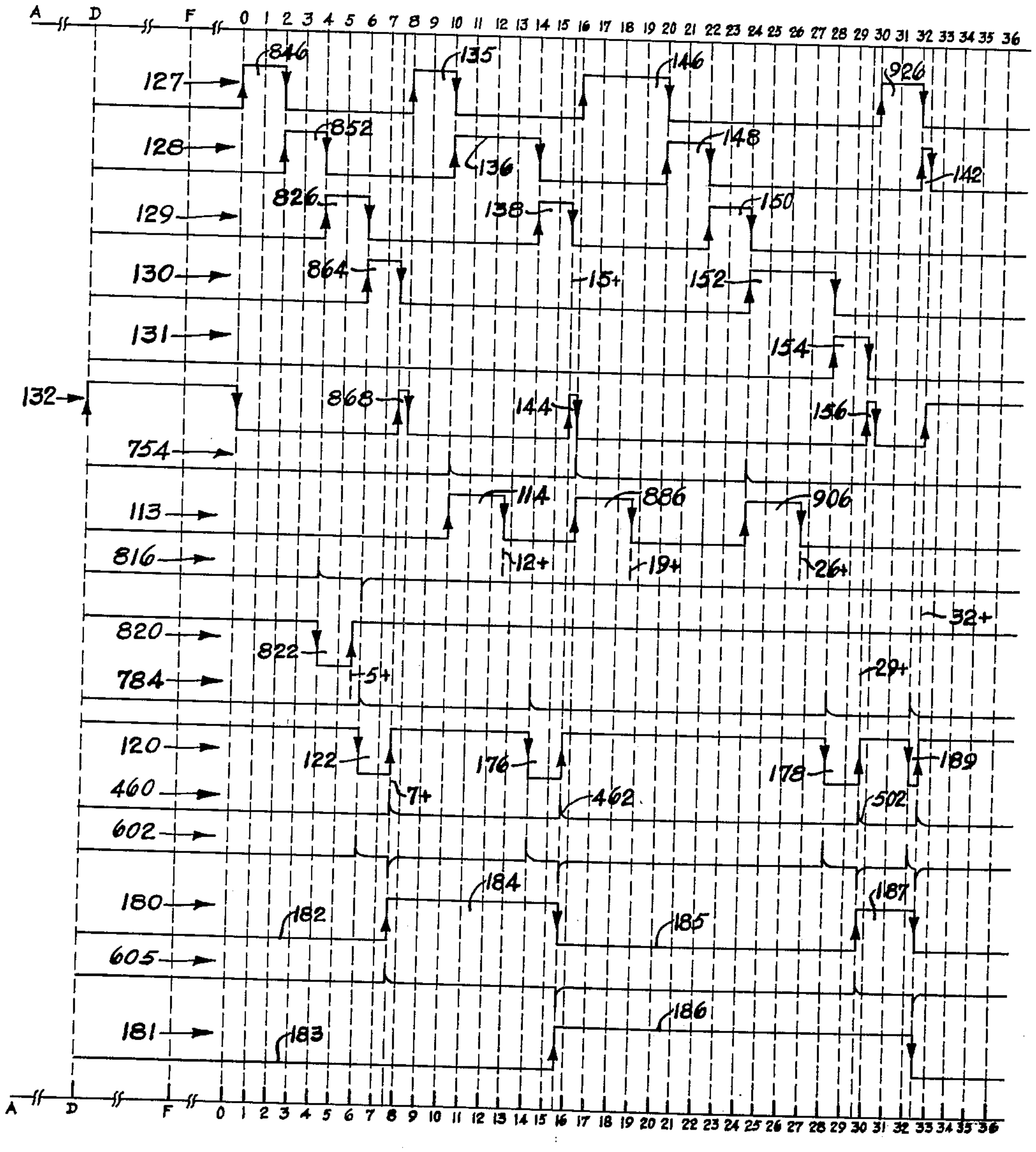

FIG. 6 is a schematic drawing of another portion of the apparatus indicated in FIG. 1 and includes start-stopping circuitry, setting and resetting circuitry and the power supply unit; and FIGS. 7 and 8 considered as a unit with FIG. 7 placed above FIG. 8 in alignment, are approximate graphical representations of the wave shapes produced by circuit elements in FIGS. 2 to 6. FIGS. 2 to 6 considered as a unit constitute a single schematic drawing for the automatic electronic keyer illustrated in block diagram form in FIG. 1.

The functional organization and operation of the keying apparatus will be understood in a general way by reference to FIGS. 1, 7 and 8. Starting means 100 (FIG. 1) controlled by aircraft radio navigation training equipment external to the keyer actuates a reset and holding circuit means 102 to release a time base generator 104 previously held blocked by the reset and holding means 102. The time base generator 104 is a free-running multivibrator which generates a square wave 106 of fixed pulse width and at a rate of approximately 5 c.p.s. for the duration of a station identification signal sequence (FIG. 7). By way of example it is assumed that the simulated radio station has identification letters AXE; moreover it is assumed to be an ILS station so that the complete signal is the Morse code representation of IAXE as indicated at 108, except that the end of the second dot of the letter I occurring at the time 3 and the beginning of the initial dot of the letter A at time 8 are separated by five spaces instead of the usual three spaces, as illustrated at 109 in FIG. 7. As shown the letter I commences at the time 0 and includes two dots; the letter A commences at the time 8 and includes a dot and a dash; the letter X commences at the time 16 and includes a dash, two dots and another dash; and the letter E commences at the time 30 and includes a dot.

For the purpose of deriving the pulse train 108 from the pulse train 106, the output of the time base generator 104 is fed to a dash mixer stage 110 (FIG. 1) which produces an output pulse train 112 which is similar to train 106 but with the required dashes inserted; the ultimately desired pulse train 108 is similar to train 112 but with the long spaces inserted. The pulse train 112 is produced by a combination of square wave train 106 and another pulse train 113 (FIG. 8). A pulse in train 113, such as the pulse 114 which commences at the time 10 and ends at the time 12+, may be regarded as suppressing the short space pulse 115 in the train 106 or may be regarded as bridging the two dot pulses 116 and 117 which occur in the train 106 respectively immediately before and after the short space pulse 115. Pulses 116 and 114 are coinitial; the former terminates at the time 11, at which time the short space pulse 115 commences. Pulse 115 terminates at the time 12, at which time pulse 117 commences, lasting thereafter until the time 13.

The derivation of pulse train 113 will be discussed hereinafter; suffice it to state for the present that the requirement of a dash beginning at the time 10 is determined at the time 10; since the dot bridging pulse 114 also commences at the time 10, it is permissible to derive pulse 114 from the dash pulse 118 in train 112, which is coinitial with the pulses 114 and 116 and represents the output of mixer 110 responsive to the bridging of the pulses 116 and 117 by pulse 114. Stated somewhat differently, input pulse 116 gives immediate rise to at least the beginning of output pulse 118, which in turn gives immediate rise to input pulse 114, which with input pulses 116 and 117 completes output pulse 118.

Pulse train 112 is fed to a long space mixer 119 (FIG. 1), which produces the desired output pulse train 108 responsive to the pulse train 112 and a long space producing pulse train 120 (FIG. 8). An audio tone generator 121 is keyed or gated by the pulses of train 108 and the audio tone as keyed according to the station identification signal is fed to ear phones of the student pilot.

A pulse in the train 120, such as the pulse 122 which commences at the time 6 and terminates at the time 7+ may be regarded as suppressing the therewith coinitial dot pulse 123 in train 112 or may be regarded as bridging the two short space pulses 124 and 125 which occur in train 112 respectively immediately before and after the dot pulse 123.

The derivation of the pulse train 120 will be discussed hereinafter; suffice it to state for the present that it is derived from the output of the dash mixer as was the dash producing pulse train 113. Thus the beginning of the pulse 123 gives immediate rise to the coinitial pulse 122 which suppresses the pulse 123 from which it is derived. Actually the pulse 122 commences slightly later than the pulse 123 owing to the inherent system delay in the generation of pulse 122 which is of the order of microseconds. Consequently the pulse 123 is not completely suppressed and a microseconds pulse spanning the leading edges of the pulses 122 and 123 is produced; however the long space mixer 119 contains slowly responsive circuit means which cannot respond to the microseconds pulse.

The derivation of the pulse trains 113 and 120 will be discussed next. An output similar to the pulse train 112 except for reversal of polarity is fed from the dash mixer 110 to a character counter 126 which is provided with five count outputs corresponding to the possible first five counts per Morse code letter. The wave shapes for these five count outputs are illustrated in order as at 127, 128, 129, 130 and 131 in FIG. 8. As previously explained, the number of counts contained in a letter equals the number of intelligence characters contained in such letter plus two. The second of the two additional counts may be regarded as the last count of such letter or the "zeroth" or reset count for the next succeeding letter. The pulse train embracing the reset count pulses is illustrated at 132 in FIG. 8. The reset count is generated within the character counter 126 but is not employed externally thereof; the wave shape 132 is included to illustrate the complete count sequence.

Considering the wave shapes 108, 112 and 127 to 132 simultaneously insofar as they apply to the letter A between the times 8 and 16, it is noted that coinitially with the dot pulses 133 and 134 occurring between the times 8 and 9 there is generated the first count pulse 135. However pulse 135 terminates at the time 10, at which time there commence the second count pulse 136 and also the second intelligence character pulse, a dash pulse indicated by 118 and 137 in trains 112 and 108 respectively. Whereas pulses 118 and 137 terminate at time 13, the count pulse terminates at time 14, at which time the third count pulse 138 commences coinitially with a pulse 140 of dot duration in pulse train 112.

In general dot count pulses such as 135 are of a duration of two units of time, whereas dash-count pulses such as 136 are of a duration of four units of time. The count pulse following the last of the intelligence character count pulses, hereinafter also referred to as a long space count pulse, is of a duration greater than one unit of time but less than two units of time. For example count pulse 138 as shown commences at the time 14 and terminates at a time 15+ as contrasted to the thereto corresponding dot pulse 140 which is coinitial with the pulse 138 but terminates at the time 15. An exception with respect to the duration of a long space count pulse arises at the termination of the call-letter sequence; in such case the pulse is of a duration less than one unit of time as indicated at 142 in the pulse train 128; this will be explained in greater detail hereinafter.

Since the letter A is composed of only two intelligence characters, a three count sequence (apart from the reset count) is produced therefor; the two intelligence characters give rise to counts 1 and 2 as represented by pulses 135 and 136, whereas count 3 is represented by the long space count pulse 138; the counts four and five are not produced. At the termination of the long space count pulse 138 there is generated the reset count pulse 144 commencing at the time 15+ and terminating at the time 16. The time 16 marks the beginning of a new sequence of counts for the letter X which is composed of the full four intelligence characters so that four intelligence character count pulses (see pulse train 108 between the times 16 and 30) and a fifth, long space count pulse, indicated at 146, 148, 150, 152 and 154 respectively are generated. Upon termination of the long space count pulse 154 there is produced another reset count pulse 156 similar to the pulse 144.

As stated, the character counter 126 is provided with four output lines corresponding to the four possible intelligence character count pulses and represented collectively by connection 157; it is further provided with a fifth output line 158 for utilization of the long space count for the Morse code letters having the full four intelligence characters namely letters B, C, F, H, J, L, P, Q, V, X, Y, Z. It is to be understood that the counts delivered by the first four output lines are generally not all intelligence character count pulses; as a matter of fact, except for the letters which are composed of the full four intelligence characters, the long space count will be delivered over the second, third and fourth count outputs for letters composed of one, two, and three intelligence characters respectively. The first four count output lines 157 are connected to an encoder or memory unit 159 through a character and letter scanner 160. The encoder 159 includes a circuit means for encoding the characters of a transmitted letter. The encoder is provided with four such circuit means for each of the letters connectable respectively to the aforesaid four count output lines. The arrangement is such that for the dot count pulses no output circuit from the character encoding devices is provided, for the dash count pulses an output circuit path is provided, for the long space count pulses an output circuit path is provided, and no output circuit path is provided for the count lines and having no count pulses thereon as for example the count line 4 in the case of the letter A.

The generation of count pulses, dashes and long spaces is as follows: At a given even-numbered time (including zero) at which a dot or a dash is to commence or at which a dot is to be suppressed to produce a long space, for example at time 10, a pulse similar to 118 but with reversed polarity is delivered from the dash mixer 110 to the character counter 126 and advances the character counter so that a pulse is delivered to the then appropriate count output line, herein line 2, the appropriate count pulse 136. At the time 10 neither the advance pulse from the dash mixer similar to pulse 118 nor the count pulse 136 "know" as yet whether a dot, a dash or a long space is to be generated. The count pulse is fed through the character and letter scanner 160 to the encoder and if it finds a device encoding a dash, it is transmitted over an output circuit path included in connections 161 to a short space suppressing generator 162, a monostable multivibrator, which feeds the dot bridging pulse 114 to the dash mixer 110 responsive to triggering by the leading edge of pulse 136. Insertion of pulse 114 into dash mixer 110, beginning at time 10, renders the pulse 118 from the output of the dash mixer, a dash pulse which in turn renders the count pulse 136 a dash count pulse. Pulse 136 continues to feed through the character and letter scanner 160 to encoder 159 but no longer controls the short space suppressing generator 162.

Instead of finding a dash encoding device, a count pulse such as 138 arriving at the encoder 159 may find a device encoding a long space rather than a dash. At the time 14, i.e. at the beginning of the count pulse 138 and of the advance pulse 140 from which it is derived, neither of the pulses 138 and 140 "know" as yet whether a dot, a dash or a long space is to be generated. The pulse 138 as stated finds a long space encoding device and is fed through over a main dot suppressing line 170 to a dot suppressing generator 172 in the form of another monostable multivibrator, which responsive to triggering by the leading edge of pulse 138 produces the dot suppressing pulse 176 in the pulse train 120. The pulse 176 suppresses from transmission through the long space mixer 119 the advance pulse 140 from which it was derived. The count pulse 138 continues to feed through the character and letter scanner 160 to encoder 159 but no longer controls the duration of the dot suppressing pulse 176; on the contrary, as will be seen hereinafter, it is the dot suppressing pulse 176 which determines the duration of the long space count pulse 138. As shown the pulses 138 and 176 are concurrent.

In the case a dot is to be generated for example at time 8, an advance pulse commencing at the time 8 and similar to the pulse 134 except for reversal of polarity is fed from the dash mixer 110 to the character counter 126 and gives rise to the corresponding dot count pulse 135. So far neither of the pulses 134 and 135 "know" as yet whether a dot, a dash or a long space is to be generated. The pulse 135 is fed through the character and letter scanner 160 to the encoder 159 and finds an encoding device which encodes a dot and is therefore provided with no output circuit. No bridging signals being provided in either of the mixers 110 and 119 the pulse 134 remains a dot pulse and the pulse 135 becomes a dot count pulse. As such pulse 135 continues to feed through the character and letter scanner 160 to the encoder 159, but finding an open circuit therein is of no effect.

Upon the termination of the long space count pulse of a given letter the reset count pulse is generated so that in the case of letters having two intelligence characters or less some of the intelligence character count lines will have no count pulses produced thereon. For example in the case of the letter A the advance is from the count 3 represented by the long space count pulse 138 to the reset pulse 144 so that with transmission of the letter A—count 4 pulse is not ever produced. The count 4 line is nevertheless connected to a fourth character encoding device for the letter A in the encoding unit 159, but no output circuit is provided therefrom. More generally for the case of letters having only on or two intelligence characters there will be provided respectively two and one character encoding devices having no output circuit and connected respectively to the count lines 3, 4 and 4. The keying apparatus is intended for the generation of any desired combination of call-letters for this reason the unused count lines and character encoding devices must be supplied. If the letter A were changed to a V the fourth count line and character encoding device would be used.

The aforegoing description covers the case of the Morse code letters having less than four intelligence characters. For the letters which do have the full four intelligence characters provision for the fifth long space count is made over line 158 as stated. In such case the following discussion for the letter X is typical. The dot pulse 177 in train 112 begins at the time 28 and terminates at the time 29. It initiates at the time 29 the corresponding count 5 long space count pulse 154, which is fed over connection 158 to cause its leading edge to trigger the dot suppressing monostable multivibrator 172. Responsive to such trigger the pulse 178 in train 120 is produced to suppress the pulse 177 from transmission through the long space mixer.

As stated the first four count outputs of the character counter 126 are connected respectively to the four character encoding devices of a given letter within encoder 159. At the end of such letter it is necessary to collectively commutate the four count outputs to the four character encoding devices of the next letter in the sequence. The character and letter scanner 160 constitutes such a commutating means and is actuated by the pulses in the train 120 through the intervening agency of a letter counter 179 which in a sense counts the letters in the sequence. No special count output lines are provided; rather the letter count is signified by combinations of high and low potentials of circuit means which produce the two wave trains 180 and 181 in FIG. 8. As shown there are produced up to the time 7+ (the end of the dot suppressing pulse 122 in train 120) low potentials 182, 183 in pulse trains 180, 181; thence until the end of pulse 176 a high potential 184 in train 181 and still the low potential 183 in train 181; thence until the end of the next dot suppressing pulse 178 a low potential 185 in train 180 and a high potential 186 in train 181; and thence until the end of the transmission of the sequence high potentials 187 and 186 in the trains 180 and 181 respectively. The dot suppressing unit 172 thus serves to advance the letter counter 179 which in turn is effective to commutate the four character count outputs as a unit. The dot suppressing unit also resets the character counter 126 by supplying an input thereto over line 188 at the end of the long space count of a letter, whether such count be 2, 3, 4 or 5, so that the counting sequence of the character counter 126 for the next sequence of characters begin with count one. The character and letter scanner 160 cooperating with the counters 126 and 179 constitutes a means for systematically searching the encoder 159 for encoded dashes and long spaces; when a dash is found in encoder 159 a short space suppressing pulse is generated by unit 162 whereas when a long space is found in encoder 159 a dot suppressing pulse is produced by unit 172.

At the termination of a complete sequence of station identification call letters the character and letter scanning means 160 supplies a stop signal to the reset and hold means 102 which in turn blocks further square wave generation by the time base generator 104 until a new start signal is applied from the starting unit 100. At the same time the reset and holding means 102 resets the letter counter 179 in readiness to commence counting another complete sequence of letters; it also arrests the multivibrator action of unit 172 thereby giving rise to a shortened dot suppressing pulse 189 which in turn gives rise to the shortened long space count pulse 142.

The keyer circuitry will now be discussed in greater detail with reference to FIGS. 2 to 6 and for the case of transmission of the call letters IAXE as previously assumed. Other modes of operation will be described hereinafter.

Figure 2:
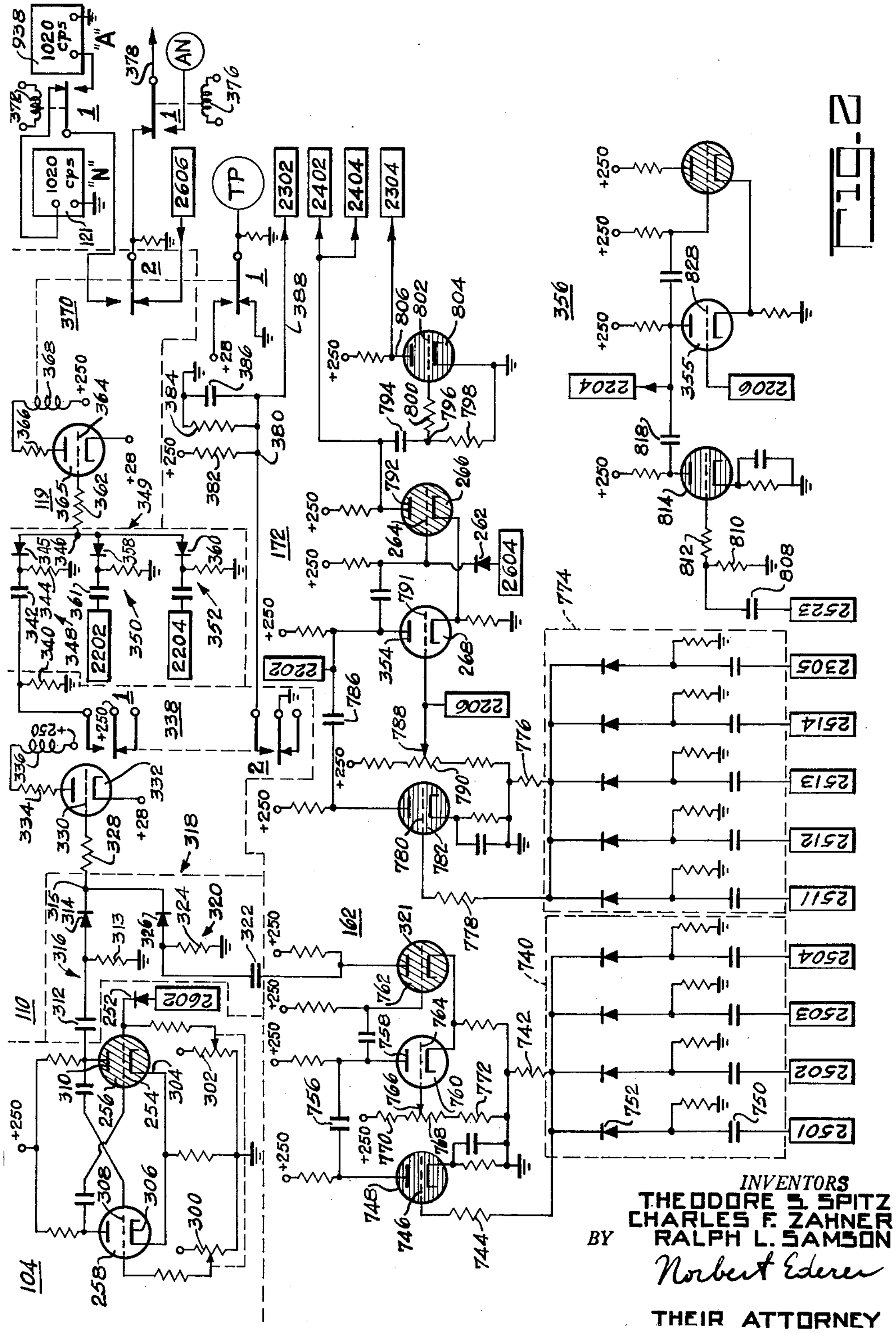
FIG. 2 is a schematic drawing of a portion of the apparatus indicated in FIG. 1 and includes time base generating, mixing, short space suppressing and dot suppressing means, shown in FIG. 1, and also circuit means for generating the specially long space following the letter I in ILS operation.

In FIGS. 2 to 6 a number of conventions have been adopted to aid in the interpretation and tracing of the circuitry described. Referring to FIG. 2 for example, it is noted that the envelopes of some of the vacuum tubes shown therein are hatched whereas others are not hatched. The former represent tubes which are usually conducting whereas the latter are usually non-conducting or cut off. "Usualism" as used herein refers to the state of the circuitry during the time intervals between successive transmissions of a station identification signal. The usually conducting tubes are divided into class A or AB amplifiers indicated by horizontal hatchings, and tubes biased for saturation (zero bias), shown diagonally hatched. A circuit interconnection between two figures is represented by a rectangular block enclosing in each of the figures one and the same four-digit reference numeral, whose thousands and hundreds digits refer to the two figures between which interconnection is made. For example the anode of a diode 252 is tied to interconnection 2602 in FIG. 2; referring to FIG. 6, interconnection 2602 is also found therein and as shown is tied to a line 251, which in turn is connected to the normally open (NO) contact 1 of a usually energized relay 242. The circuit is traced "from the NO contact 1 of usually energized relay 242, over line 251, interconnection 2602 to the anode of diode 252" and this language is typical of the description of circuitry having "interconnections" represented by a rectangular block enclosing a four-digit reference numeral. The location in FIGS. 2 and 6 is implicit. "Normalcy" as used herein with reference to the state of relay contacts is intended to signify said state with all sources of energization disconnected. However, as a further aid in the interpretation, the relays are represented in the usual condition for a four-letter sequence. The above-mentioned relay 242 is usually energized, hence connection through its NO contact 1 is usually complete as shown. On the other hand relay 338 (FIG. 2) is usually deenergized and hence connection through its NO contact 1 is, as shown, usually incomplete; connection is usually complete through its normally closed (NC) contact 1, as shown.

In the interest of avoiding confusing long wires having multiple bends or corners, and similarly confusing multiple wire crossings, the aforediscussed representation of an interconnection is also employed for interconnection of circuitry appearing on one and the same figure. In such case the thousands and hundreds digits of the associated reference numeral are alike and are the same as the number of the figure wherein this reference numeral is found twice. For example, an interconnection labeled 2202 is found in two places in FIG. 2 and as shown interconnects the anode 354 of a usually nonconducting triode 268 and a capacitor 361.

Referring to FIG. 6 there is shown a power supply unit 190 which is provided with a pair of heater terminals $H_1$ and $H_2$ for supplying the tubes of the automatic keyer with filament heater power, a C+ terminal for supplying +28 volts D.C., a B+ terminal for supplying +250 volts D.C. and a ground terminal 0. The first four of these power supply terminals are connected to respective outgoing lines 192, 194, 196 and 198 through respective contacts of a four-pole-double-throw power switch 200. When switch 200 is thrown from the indicated off-position to the alternate on-position heater power is applied immediately to the various tubes in the keyer circuitry. This event occurs at time A in FIG. 7. At the same time +28 volts is supplied over line 196 to a terminal 202 to which the various points in the drawings labelled as +28 are connected. The B+ voltage however is not applied immediately to permit prior thereto tube warm-up and setting of the apparatus, particularly the counters. To this end there is connected to the +28 volt line 196 one end of a heater 204 of a thermal time delay relay 206; the other end of heater 204 is connected to ground over line 208 and the grounded NC contact 1 of a presently deenergized relay 292. Heater 204 after some time delay heats sufficiently to actuate the movable contact 212 of relay 206 thereby to close its NO contact 214. This event occurs at time B in FIG. 7. Closure of contact 214 completes an energization circuit for a coil 216 of a relay 218, which energization circuit extends from the +28 volt line 196 over the movable contact 212, the NO contact 214 and relay coil 216 to ground. The relay 218 is provided with four sets of contacts; all except the third of its movable contacts are connected to the +28 volt line 196. With the energization of relay 216, 28 volts D.C. is routed from line 196 over the NO contact 1 of relay 216, through the anode and then the cathode of diode 220, over interconnection 3602 to reset input terminals R of the character counter 126. This, as will be seen hereinafter assures that when +250 volts is applied to the tubes shown in FIG. 3 the said tubes will assume the conditions indicated therein. The diode 220 is provided to block transmission in the reverse connection thereby to prevent cross-talk. Diodes provided for the same purpose will be referred to as blocking diodes, +28 volts are also routed from line 196 over the NO contact 2 of relay 216 through the anode and then the cathode of a blocking diode 222, lines 224 and 226 to the grid 228 of a triode 230, whose cathode is tied to +28 volts and whose anode is connected through the coil 232 of a control relay 234 and through resistor 236, lines 238 and 240, the NO contact 3 of now energized relay 216 to the B+ line 198. In view of the net zero bias between the grid and cathode of triode 230 and application of B+ power to its anode, triode 230 is rendered conductive as indicated and control relay 234 is energized as indicated in FIG. 6. The states of relay 234 are also indicated in FIG. 7 as by wave train 241; during the time intervals of deenergization, such as from A to B, the relay is deenergized as signified by the upper horizontal line; beginning at B relay 234 is energized as indicated by the lower horizontal line. This convention representing the states of relays will be used for other relays hereinafter. Energization of relay 234 effects, after the short time delay requisite for closure of its contacts, energization also of a reset and hold relay 242 whose coil 244 is connected at one end to +28 volts and at its other end over lines 246 and 248 and the NO contact 1 of now energized relay 234 to ground. The states of relay 242 are indicated by wave train 249 (FIG. 7); as shown initial energization occurs at time C. With the energization of the reset and hold relay 242, +28 volts are routed over its NO contact 1, line 251, interconnection 2602 through the anode and then through the cathode of blocking diode 252 to the grid 254 of the usually conducting triode 256 which together with the usually non-conducting triode 258 and associated circuitry constitutes the time base generator 104. As will be seen hereinafter application of +28 volts D.C. to the grid 254 assures that when +250 volts is applied to the plate circuits of the triodes 256 and 258, their square wave generating action shall be blocked and triode 256 shall be the conducting tube whereas triode 258 shall be the non-conducting tube.

+28 volts is routed over the NO contact 2 of relay 242 over line 260, interconnection 2604 through the anode and then the cathode of a blocking diode 262 to the grid 264 of the usually conducting triode 266 which together with the usually non-conducting triode 268 constitutes the dot suppressing monostable multivibrator 172. Application of +28 volts D.C. to the grid 264 is of no consequence at the present; when +250 volts is applied to the plate circuits of the triodes 266 and 268 these triodes would assume respective conditions as indicated, even in the absence of the application of the +28 volts to grid 264, in the absence of a trigger pulse. Application of +28 volts to the grid 264 is of a significance at the termination of the sequence and produces the shortened multivibrator pulse 189 as previously indicated and as more fully described hereinafter. The movable contact 3 of relay 242 will be supplied by +250 volts shortly after energization of relay 242 as will be seen immediately hereinafter. Consequently +250 volts will be routed over the NO contact 3 of relay 242 through a voltage divider comprising resistors 270 and 272 to ground. A voltage is derived from the tap point 274 of the voltage divider and routed over interconnection 4602 ultimately to grids 276 and 278 of triodes 280 and 282 respectively. This is to assure that these triodes shall be the usually conducting tubes for a four letter sequence, whereas the respectively associated triodes 284 and 286 shall be the non-conducting tubes. The triodes 280 and 284 and the triodes 282 and 286 constitute stages of the letter counter 179. The relay 242 and associated circuitry constitute the reset and holding means 102 previously referred to.

It will be recalled that closure of the power switch 200 resulted in energization of the relays 206, 218, 234 and 242. With energization of relay 218, +28 volts are routed over its NO contact 4, line 238 to an end of a coil 290 of a relay 292. The other end of coil 290 is grounded, so that relay 292 is also energized. Relay 292 may be selected to be a slowly responsive relay to assure that the other aforesaid relays are all energized before relay 292 is energized. Upon energization of relay 292 a hold circuit therefor is established from the +28 volt line 196 over its NO contact 4 through the coil 290 to ground so that relay 292 will remain energized even upon deenergization of relay 218 occurring shortly thereafter.

With the energization of relay 292, +250 volts are routed from line 198 over the NO contact 2 of relay 292 to a terminal 294 to which the various circuit points labelled +250 are connected, and B+ voltage is now applied to these points. An alternate plate circuit connection for the control relay triode 230 is provided from the NO contact 2 of relay 292 through its NO contact 3 and line 296 to line 238 to assure that the triode 230 will remain conducting and relay 234 will continue to be energized even though relay 218 releases. With the application of the +250 volts the various tubes and relays shown in FIGS. 2 to 6 assume the conditions as indicated in the drawings; this event occurs at the time D in FIGS. 7 and 8.

Energization of relay 292 also opens the energization circuit of the heater 204 of the thermal time delay relay 206 in view of the disconnection of the movable contact 1 of relay 292 from its grounded NC contact 1. However, there is a delay in the cooling of the heater 204 and for a short time its movable contact 212 continues to engage its NO contact 214 so that the relays 218 and 292 remains energized. Thereafter the relay 206 and also the relay 218 release, but relay 292 remains energized through its hold circuit. The control relay 234 likewise remains energized as +250 volts continues to be supplied through the NO contact 3 of relay 292 and +28 volts continues to be supplied to the grid 228 of triode 230 through resistor 298.

The setting relay 292 is still energized and remains energized so long as power from the supply 190 is turned on; the control relay 234 is still energized and remains energized until released by the starting means 100 at time F. With relays 292 and 234 still energized the reset and hold relay 242 also remains energized, whereas the setting relays 206 and 218 are now deenergized. The tubes and relays in FIGS. 2 to 6, as previously stated and as will be more fully explained hereinafter, have assumed their respective usual conditions as illustrated; the time base generator 104 is blocked, the dot suppressing generator 172 is likewise blocked, and the character counter 126 and letter counter 179 are set for the initial count 0.

As has been indicated, with the initiation of the sequence the character counter advances from the count 0 to the count 1 and the character count sequence is accordingly 1, 2, 3, 4, 5, with the counts 3, 4 or 5 possibly omitted, depending on the number of intelligence characters. On the other hand the complete letter count sequence is 0, 1, 2, 3 rather than 1, 2, 3, 4. Referring to FIG. 8, it is noted that at the time D the wave trains 180 and 181 reflect the lower potentials 182 and 183 respectively, signifying count 0. Count 0 continues for practically the entire transmission of the letter I until the time 7+. At the end of the transmission of the complete sequence, beginning at the time 32+ the low potentials for wave trains 180 and 181 are repeated so that the letter counter 179 is reset to count 0. This explains in part the choice of the sequence 0, 1, 2, 3; as will be seen hereinafter, the further reason therefor resides in the manner in which identification sequences of less than four letters are generated. In such case the zeroth letter is by-passed. For a three letter identification signal for example the sequence is 1, 2, 3; in the case of a two letter identification signal the sequence is to all intents and purposes 1, 2, and in the case of a one letter identification signal the sequence is to all intents and purposes simply 1 continuously.

Referring to FIG. 2, the time base generator 104 is a cathode coupled astable or free-running multivibrator and as shown includes a dual potentiometer whose two sections 300 and 302 are included in the timing circuits of the triodes 258 and 256 respectively to permit manual adjustment of the multivibrator frequency, which as stated is approximately 5 c.p.s. At the time D when +250 volts is applied to the plate circuits of multivibrator 104 the time base is not generated owing to the application of +28 volts to the grid 254 of triode 256 through diode 252 in the manner previously explained. The tube 256 is caused to conduct a large saturation anode current establishing a relatively high potential at its cathode 304 and also the cathode 306 of tube 258 connected thereto. The cathode potential is considerably higher than the potential at the grid 308 of tube 258, cutting off tube 258 as indicated. The potential of the anode 310 is minimum due to the aforesaid saturation current and is so indicated in wave train 106 between the times D and 0. When at the time 0 the application of +28 volts through diode 252 to grid 254 ceases the time base generation commences with the anode 310 of the tube 254 switching from the low saturation potential to B+ potential due to anode current cut-off in well-known manner. The pulse train 106 reflects the voltage of anode 310 which is coupled through a coupling capacitor 312 to an end of a bias resistor 313 whose other end is grounded and also from the junction of capacitor 312 and resistor 313 through the anode and then through the cathode of a blocking diode 314 to a junction point 315. The combination of capacitor 312, resistor 313 and diode 314 provides an input 316 to an OR gate 318; a second OR gate input 320 is provided from the anode of the usually non-conducting triode 321 of the short space suppressing monostable or one-shot multivibrator 162, which will also be referred to as the dash multivibrator. As shown the OR gate input 320 is provided in similar manner by capacitor 322, resistor 324, and diode 326; the cathode of diode 326 is also tied to junction point 315. Circuit junction 315 is at the higher of two significant potentials, if and only if at least one of the OR gate inputs is at the higher of its respective two possible potentials; hence the denomination OR gate, the "OR" being the conjunctive "OR." Between the times D and 0 both inputs to the gate 318 are at the lower of their respective two possible potentials, namely the ground potential of resistors 313 and 324, so that the gate is closed and hence the junction point 315 is at the lower of two significant potentials, namely ground potential, which is transmitted through a grid current limiting resistor 328 to the grid 330 of a triode 332 whose cathode is tied to +28 volts and whose anode is connected through resistor 334 and the coil 336 of an intelligence character transmitting relay 338 to +250 volts. The high net negative bias of triode 332 places it at the time D in its usual cut-off condition and consequently relay 338 is in its usual deenergized condition illustrated. The relay 338 will be referred to briefly as the character relay. It constitutes together with the gate 318, triode 332 and associated circuitry the dash mixer 110.

The potential rise of the anode 310 at the time 0 is transmitted through the OR gate 318 to the grid 330 and such higher potential causes plate current conduction of the triode 332 and the attendant energization of relay 336. At the time 10 when a dash is generated both inputs to gate 310 supply high potentials to grid 330, causing perhaps even greater conduction of tube 332 but this is not of significance insofar as the operation is concerned as the effect thereof is no more than also to energize the character relay 338.

The movable contact 1 of character relay 338 is connected to +250 volts whereas its NO contact 1 is connected through a bias resistor 340 to ground and also through a coupling condenser 342 and another bias resistor 344 to ground; the junction of capacitor 342 and resistor 344 is also connected through the cathode and then through the anode of a diode 345 to a junction point 346. The combination of capacitor 342, resistor 344 and diode 345 (connected in the reverse manner for transmission of a positive voltage) provides an input 348 to an AND gate 349. Two additional similar inputs 350 and 352 to the AND gate 349 are provided, the former being from the anode 354 of the usually non-conducting triode 268 of the dot suppressing monostable or one-shot multivibrator 172, hereinafter also referred to as the space multivibrator, over connection 2202, and the latter from the anode of the usually non-conducting triode 355 of a similar monostable multivibrator 356 over connection 2204. The monostable multivibrator 356 is provided for the generation of the five unit-space separating the second dot of the letter I and the initial dot of the letter A in the manner hereinafter described.

The AND gate 349 is so named in view of the fact that the potential at the junction 346 is the higher of two possible significant potentials, if and only if the three inputs 348, 350 and 352 thereto are respectively at their higher of the two possible potentials. This condition is satisfied by the inputs 350 and 352 in the usual condition in view of the connection to the anodes of normally non-conducting triodes which anodes are at B+ potential; however under the usual conditions prevailing at the time D the input 348 is at the lower possible potential, namely the ground potential of resistors 340 and 344. In view of the low potential of input 348 the high potentials of the inputs 350 and 352 are attenuated at the junction 346 by the voltage division through the reverse resistance of the respective diodes 358 and 360 and thence through resistor 344 to ground, the forward resistance of the diode 345 preceding resistor 344, as seen from the inputs 350 and 352, being negligible. Because of such voltage division the potential of the junction 346 is the lower of the two significant ones and this condition is continued until the time 0. So long as at least one of the inputs 348, 350 and 352 is at the lower possible of its potentials namely ground potential a similar voltage division is effected. The low potential of point 346 is transmitted through a grid current limiting resistor 362 to the grid 364 of a triode 365 whose cathode is tied to +28 volts and whose anode is connected through a resistor 366 and the coil 368 of a final output relay 370 to +250 volts. In view of the high net negative grid to cathode bias of triode 365 the triode plate current is usually cut off and the relay 370 is usually deenergized as indicated. Relay 370 constitutes together with gate 349, triode 365 and associated circuitry the long space mixer 119.

At the time 0 the relay 338 is energized as previously explained applying +250 volts to the AND gate input 348 through the NO contact 1 of character relay 338. The other inputs 350 and 352 remain at their respective higher potentials so that no significant voltage division occurs through any one of the diodes in gate 349 and resistors of the various inputs thereto. As a result the potential at the junction 346 will rise to the higher significant potential, rendering triode 365 conductive and energizing the output relay 370. The movable contact 1 of relay 370 is connected to a test point TP, its NC contact 1 is grounded, whereas its NO contact 1 is connected to +28 volts. The energization and deenergization of relay 370 is accordingly reflected at the test point TP in the form of the finally desired wave shape 108 with the lower ground potential indicated between the times D and 0 and the higher +28 volts indicated beginning at time 0. The NC contact 2 of relay 370 may for the time being be assumed to be permanently grounded over interconnection 2606; its NO contact 2 is connected through the NO contact 1 of a relay 372 assumed for the time being to be permanently energized to the 1020 c.p.s. audio tone generator 121. Accordingly with the energization and deenergization of the relay 370 its movable contact 2 will alternately deliver an audio tone and be grounded. The audio signal on the NO contact 2 of relay 370 will be keyed in accordance with the station identification call letters as reflected by wave shape 108. The keyed audio is fed from the NO contact 2 of relay 370 through the NO contact 1 of a relay 376 presently assumed to be permanently deenergized to an output line 378 leading to the student pilot's earphones.

As previously indicated the dash mixer 110 delivers to the character counter 126 an output pulse train similar to train 112 but reversed in polarity. The similar train is derived from the NO contact 2 of the character relay 338 in the following manenr. The NO contact 2 is tied to a tap point 380 of a voltage divider comprising resistors 382 and 384 whose other ends are respectively connected to +250 volts and to ground. Hence the usual potential of the NO contact 2 of relay 338 is the potential obtained by the division of voltage between resistors 382 and 384. A charging capacitor 386 is shunted across resistor 384. With energization of the relay 338 the ground potential of the movable contact 2 is imparted to the NO contact 2 and therefore also to the tap 380 causing rapid discharge of the capacitor 386. The alternate high and ground potentials of the tap 380 are transmitted over line 388 and interconnection 2302 to a set input terminal S of the first stage 390 of a three stage binary character counter 126, the additional stages 392 and 394 begin structurally identical to the stage 390. As shown the stage 390 includes the usually conducting triode 396 and the usually non-conducting triode 398 of a well-known symmetrical Eccles-Jordan type trigger or flip-flop or bistable multivibrator circuit whose cathodes are connected together and through a resistor 400 to ground. The resistor 400 is shunted by a by-pass capacitor 402. The anodes 404 and 406 of the triodes 396 and 398 are connected respectively through like resistors 408 and 410 to a circuit junction point 412 which in turn is connected to +250 volts through a resistor 414. The pulse train arriving over connection 2302 to the set input terminal S is passed through a differentiating capacitor 416 to the junction point 412 and is represented in FIG. 7, as differentiated, by the pulse train 418. This incoming wave train is negative going at the time 0 and therefore gives rise to the first differentiated spike 420. At the time 1 the incoming pulse train is positive going and gives rise to the positive differentiated spike 422. The counter stages as typified by stage 390 experience "flipping" action responsive only to the negative differentiated spikes such as 420 and are insensitive to the positive trigger spikes such as 422.

It will be recalled that at the time C +28 volts is applied over interconnection 3602 to the interconnected reset input terminals R of the three counter stages. This is transmitted through respective blocking diodes such as the diode 424 of the first stage 390 to the grids of the usually conducting triodes such as the triode 396 in stage 390. When B+ power is applied at the time D, owing to the application of +28 volts to its grid the triode 396 is rendered conducting and the triode 398 is necessarily rendered non-conducting. The triodes are stable in their respective states attained at the time D and these states are retained even upon disconnection of the +28 volt presetting voltage from the reset input terminals R due to the release of the setting relay 218. At the time 0 the first negative differentiated spike 420 arrives at the junction 412 and switches the triodes 396 and 398 to their alternate stable states, the triode 396 being rendered non-conducting and the triode 398 being rendered conducting. The potential of the anode 406 drops to the minimum saturation potential and the potential of the anode 404 rises to the B+ cut-off potential. The anode 406 is connected over line 424 to an output terminal 0 and the anode 404 is connected over line 425 to an output terminal 1; the labels 0 and 1 signify binary counts for the stage 390. The wave shape produced at the terminal 1 of stage 390 is illustrated in FIG. 7 as at 428. The wave shape at its terminal 0 is of course of opposite polarity and as such is transmitted over line 426 to the corresponding set input terminal S of the second stage 392 from which it is passed through a differentiating condenser 427 to a junction point 429 corresponding to the junction point 412 of a stage 390. The incoming wave shape to the stage 392 as differentiated is illustrated in FIG. 7 as at 430. The initial differentiated spike 432 therein, arriving at the junction point 429 at the time 0, is negative and "flips" stage 392 over, cutting-off the usually conducting triode 434 and turning on the usually non-conducting triode 436. The anode potential of the triode 434, appearing at the corersponding output terminal 1 rises. The pulse train produced at the terminal 1 of stage 392 is indicated in FIG. 7 as at 438 and as shown is rising at the time 0. The anode potential of the triode 436, appearing at the corresponding output terminal 0 drops at the time 0. The pulse train at the terminal 0 of stage 392 is of course of opposite polarity to that appearing at the terminal 1 of stage 392, and as such is transmitted over line 440 to the corresponding set input terminal S of the third stage 394, thence through a differentiating condenser 442 similar to differentiating condensers 416 and 427 to a junction point 444 corresponding to the junction point 412 and 429. The differentiated wave form is indicated in FIG. 7 as at 445. The first differentiated spike 447 therein, arriving at the time 0, is negative and "flips" the third stage over. The potential of the anode of the usually conducting triode 446 appearing at the corresponding terminal 1 rises and the potential of the anode of the usually non-conducting triode 448, appearing at the corresponding terminal 0 drops. The wave shape appearing at the terminal 1 of stage 394 is illustrated in FIG. 7 as at 450, and as shown a rising voltage is produced at the time 0.

The cooperation of the three stages is best explained with reference also to FIGS. 7 and 8 for the interval between the times 16 and 30, i.e. the generation of the letter X. At the time 14 a pulse arrives at the interconnection 2304 from the space multivibrator 172. The pulse train transmitted over interconnection 2304 is the previously referred to train 120 illustrated in FIG. 8 and the particular pulse in question is the pulse 176, which as shown has a negative leading edge at the time 14 and a positive trailing edge at the time 15+. The pulse 176 and more generally the pulse train 120 is passed through a differentiating capacitor 452 to a differentiating resistor 454 whose one end is connected to a capacitor 452 and whose other end is grounded. The three reset terminals are tied to the junction of the capacitor 452 and resistor 454. The negative differentiated spike corresponding to the leading edge of pulse 176 is blocked by the diode 424 in stage 390 and the corresponding diodes 456 and 458 in the other stages, the diodes having their anodes connected to the terminals R and their cathodes to the respective grids of the usually conducting tubes. The positive spike occurring at the time 15+ is however passed by the diodes and is effective to "flip over" to the usual condition such of the three stages as had not been in the usual condition at the time 15+. The train of positive trigger spikes applied to the grids of the usually conducting tubes is illustrated in FIG. 8 as at 460. For convenience the trigger spikes are also shown in time alignment below the three wave shapes 428, 438 and 450 which are transmitted to the respective output terminals 1 of the three stages. Thus the trigger 462 occurring at the time 15+ "flips over" the first and third stage as indicated in the wave shape 428 and 450, but is of no effect as regards the second stage which prior to the time 15+ had been in its usual condition.

At the time 16 a dash pulse similar to the pulse 464 in wave train 112 but reversed in polarity commences and is transmitted over interconnection 2302 to the set input terminal S of the first stage 390 and gives rise at the time 16 to the negative trigger 465 in wave train 418 and at the time 19 to the terminal positive trigger 466. The negative trigger 465 is effective to "flip over" stage 390 thereby producing the positive pulse 468 in pulse train 428. A pulse similar to pulse 468 but of opposite polarity is fed from the output terminal 0 of stage 390 to the set input terminal S of stage 392 and is differentiated by capacitor 428, producing the negative trigger 470 in wave train 430 at the time 16, which "flips over" the second stage producing the positive pulse 472 in wave shape 438. A pulse similar to the pulse 472 but of opposite polarity is fed from the output terminal 0 of the second stage to the set input terminal S of the third stage and produces the negative trigger spike 474 in wave train 445 at the time 16. The trigger 474 is effective to "flip over" the third stage producing the positive pulse 476 in the pulse train 450.

Thus it is seen that at the time 15+ the three stages are reset to the count 0 by the reset trigger spike 462 and at the time 16 they are set to the count 1 owing to the arrival of the trigger spike 464. More generally, prior to the commencement of the first character of a letter the three stages will be reset to 0 and at the commencement of the first character of such letter they will be set to 1.

The positive trigger 466 occurring at the time 19 and corresponding to the end of the dash pulse 464 is ineffective to trigger the stage 390 and therefore as shown the positive pulses 468, 472 and 476 continue beyond the time 19. At the time 20 the second character of the letter X, namely a dot commences. This gives rise to a negative trigger in the wave train 418 which reverts the stage 390 to its usual condition once more, thus terminating the positive pulse 468 in train 428 and commencing the negative pulse 477. However the consequential differentiated spike in the train 430 is now positive and as such is ineffective to "flip over" the second stage so that the pulse 472 in train 438 and consequently also the pulse 476 in the train 450 continue beyond the time 20. The termination of the dot at the time 21 produces a positive spike at the junction point 412 which is incapable to flip over the first stage; the stages remain in the conditions as at time 20. The next alternation of states of the stage 390 does not occur until commencement of the second dot of the letter X at the time 22. At such time a negative spike in the train 418 is produced and effects termination of the negative pulse 477 and initiation of the positive pulse 478 in pulse train 428. The flipping of the first stage produces a negative trigger 480 in the pulse train 430 which flips over the second stage thereby terminating the positive pulse 472 and commencing the negative pulse 482 in pulse train 438. The flipping of the second stage results in a positive spike 484 in the train 445 at the time 22 which is ineffective to flip over the third stage so that the pulse 476 continues beyond the time 22. The termination of the second dot at the time 23 produces a positive spike at the junction 412 which is ineffective to flip over the first stage so that the pulse 478 continues beyond the time 23 as do the pulses 482 and 476. At the time 24 the fourth character of the letter X, namely a dash, commences giving rise to a negative trigger in the train 418 which flips over the first stage thereby terminating the positive pulse 478 in the train 428 and commencing the negative pulse 486 therein. The flipping of the first stage produces a positive spike in the train 430 which is ineffective to flip over second stage so that the pulses 482 and 476 continue beyond the time 24. At the time 27 the dash terminates, producing the positive trigger 488 in the train 418 which however is ineffective to flip over the first stage so that the pulses 486, 482 and 476 continue beyond the time 27. At the time 28 the pulse 177 in pulse train 112 of dot duration, corresponding to fifth long space count of the letter X, is produced and this gives rise to the negative trigger 490 in wave train 418 which "flips over" the first stage thereby terminating the negative pulse 486 and commencing the positive pulse 492 in the pulse train 428. The flipping of the first stage gives rise to a negative trigger 494 in the train 430 at the time 28 which produces flipping action of the second stage thereby terminating the negative pulse 482 and commencing the positive pulse 496, which in turn produces the negative trigger 498 in wave train 445 which is effective to flip over the third stage thereby terminating the positive pulse 476 and commencing the negative pulse 500.

At the time 29 the pulse 177 terminates and this gives rise to a positive spike in the train 418 at time 29 which is ineffective to produce flipping action so that the pulses 492, 496 and 500 continue beyond the time 29. The space multivibrator 172 at the time 28 began generating the negative pulse 178 in train 120 responsive to pulse 177; the pulse 178 terminates at the time 29+. It is differentiated by capacitor 452 and resistor 454 and as differentiated applied to the reset input terminals R of the three stages, thence passed through the respective blocking diodes 424, 456 and 458 which block the negative spike at the time 28 but transmit the positive reset trigger spike 502 in pulse train 460 at the time 29+. The trigger spike 502 in this instance resets the first and second stages, thereby terminating the positive pulses 492 and 496, but does not affect the third stage which had been in its usual condition so that negative pulse 500 continues beyond the time 29+. The three stages are now reset to the usual conditions in readiness for the letter E. The flipping of the first and second stages due to the reset trigger spike 502 at the time 29+ produces concurrent positive differentiated spikes in the wave trains 430 and 445 which of course are of no effect.

To summarize the operation of the binary character counter 126, the three stages are in their usual condition upon resetting thereof; at the beginning of the first intelligence character of a letter they are in the "unusual" condition. They experience no change in state at the end of the first intelligence character; at the beginning of the second intelligence character the first stage reverts back to the usual condition whereas the second and third stages stay in the unusual condition; no change of state is experienced at the end of the second intelligence character. At the beginning of the third intelligence character the first stage is placed in the unusual condition whereas the second stage reverts back to the usual condition and the third stage remains in the unusual condition; no change in state is experienced at the end of the third intelligence character; at the beginning of the fourth intelligence character the first stage reverts to the usual condition whereas the second and third stages retain their usual and unusual conditions respectively; no change in state is experienced at the end of the fourth intelligence character; at the beginning of the dot pulse which follows the fourth intelligence character the first and second stages are placed in the unusual conditions and the third stage reverts to the usual condition; at the end of such dot pulse no change in state is experienced; thereafter the reset pulse arrives and reverts the first and second stage to the usual condition but has no effect on the third stage which already is in the usual condition. The states of the stages are represented more compactly in the following truth table wherein the truth values T (true) and F (false) are applied to the proposition that the output terminal 1 of the stage in question is, for the particular count considered, at the higher of its two possible potentials, which is the negation of the proposition that the stage is in its usual condition.

| Count | Stage 1 | Stage 2 | Stage 3 |
|---|---|---|---|
| 0 (Reset) | F | F | F |
| 1 | T | T | T |
| 2 | F | T | T |
| 3 | T | F | T |
| 4 | F | F | T |
| 5 | T | T | F |
| 6 | F | T | F |
| 7 | T | F | F |
| 8 or 0 (Reset) | F | F | F |

The above truth table includes also the counts 6 and 7 for the sake of completeness, although these counts are not ever produced in the keyer. In the case of letters having less than the full four intelligence characters, i.e. less than the full five counts, the advance is directly from the long space count to the reset count. In the case of a two-count letter, for example the letter E as indicated in FIG. 7, with arrival of the reset trigger spike at time 32+ following the count 2, only the second and third stages are placed in the usual condition, the first stage having attained it at the time 32, the beginning of count 2. In the case of a three-count letter, such as the letter A as indicated in FIG. 7, with the arrival of the reset spike at the time 15+ following the count 3, only the first and third stages are placed in the usual condition, the second stage having attained it at the time 14, the beginning of count 3. In the case of a four-count letter, such as for example the letter I in FIG. 7, with the arrival of the reset trigger spike at the time 7+ following the count 4, only the third stage is placed in the usual condition, the first stage having attained it at the time 6, the beginning of count 4, and the second stage having attained it at the time 4, the beginning of count 3. The letter I is composed of two dots and therefore ordinarily of only three counts; the added fourth count arises out of the generation of the five-units-of-time long space previously referred to and discussed more fully hereinafter.

Figure 3:
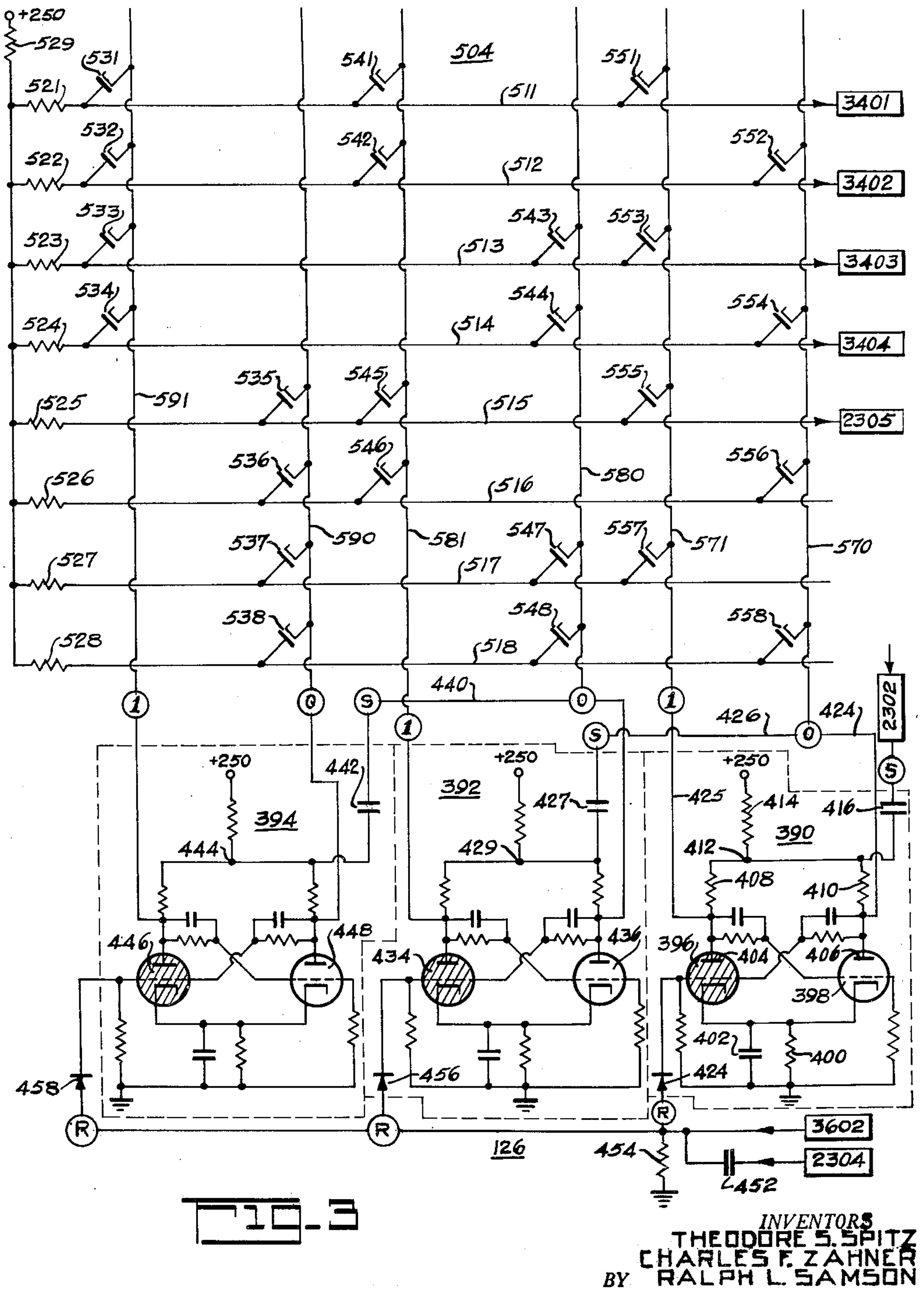
FIG. 3 is a schematic drawing of another portion of the apparatus indicated in FIG. 1 and includes circuitry for counting the characters of the letters in the sequence.

The count pulse trains 127 to 132 are produced responsive to the alternations of states of the three counter stages by means of a well-known diode matrix generally indicated as at 504 in FIG. 3. The matrix is composed of a series of eight horizontal output lines 511 to 518 inclusive which are connected respectively through resistors 521 to 528 inclusive and through a resistor 529 to +250 volts. The units digit for the eight horizontal output lines and eight resistors connected respectively thereto is intended also to signify the associated count output. The counts 6 and 7 of course are not ever produced so that no output connection is provided from the lines 516 and 517. The reset count is produced on line 518 but is not employed externally of the character counter 126, so that no output connection is provided from the line 518. The lines 516, 517 and 518 and the associated resistors and blocking diodes connected thereto have been included for the sake of completeness but could be dispensed with.

Each of the horizontal lines has connected thereto anodes of three blocking diodes identified by a reference numeral whose hundreds digit is five, whose units digit is the same as that of the horizontal lines to which its anode is connected and whose tens digit is respectively in order from left to right 3, 4, 5. The diodes are arranged in six vertical columns each containing four of the diodes. As shown the diodes 552, 554, 556 and 558 have their cathodes connected to the output terminal 0 of the first counter stage 390 through an interconnecting vertical line 570; the diodes 551, 553, 555 and 557 have their cathodes connected to the output terminal 1 of the first counter stage 390 through an interconnecting vertical line 571; the diodes 543, 544, 547 and 548 have their cathodes tied to the output terminal 0 of the second counter stage 392 over a vertical interconnecting line 580; the diodes 541, 542, 545 and 546 have their cathodes tied to the output terminal 1 of the second counter stage 392 over a vertical interconnecting line 581; the diodes 535 to 538 inclusive have their cathodes tied to the output terminal 0 of the third counter stage 394 over a vertical interconnecting line 590 and the diodes 531 to 534 inclusive have their cathodes tied to the output terminal 1 of the third stage 394 over a vertical interconnecting line 591.

Each horizontal row of diodes operates in AND circuit fashion, in that the thereto connected horizontal count output line is at the higher potential, if and only if each of the thereto connected vertical lines is at the higher of its two possible potentials. Considering the count 1 output line 511 for example and referring also to the aforegoing truth table, at the count 1 the lines 571, 581 and 591, which are connected respectively to the cathodes of the diodes 551, 541 and 531, are at the higher of two potentials, as signified by the truth value T for each stage. Their anodes are tied to +250 volts through resistors 521 and 529. The potential difference between anode and cathode is small so that the count output line 511 is also at the higher potential. Referring again to the truth table, at the count 2 the line 571 tied to the output terminal 1 of stage 390 is no longer at the higher of its two potentials as signified by the truth value F for stage 1, so that at the count 2 a substantial diode current flows from the +250 volt line through resistors 529 and 521, line 511, diode 551, line 571 to the output terminal 1 of the first stage 390, producing a drop in potential at the diode connected end of resistor 521 whereby the line 511 is placed at the lower of its two significant potentials. The fact that the lines 581 and 591 remained at higher potentials as during count 1 does not prevent the drop in potential on line 511. During any of the remaining counts at least one of the three lines 571, 581 and 591 is at the lower of the two possible potentials whereby at least one of the three associated diodes 551, 541 and 531 is rendered conductive thereby maintaining the lower potential on the line 511. Slight variations in potential on line 511 may occur depending on whether one, two or all three diodes are conducting but this is of no significance in the operation of the keyer, for as will be recalled the count outputs ultimately either arrive in the encoder at open circuits or are passed therethrough to trigger the dash multivibrator 162 or the space multivibrator 172, which are on-off type devices.

The arrangement of the rows and columns of diodes is best explained with reference to the truth table. The generation of the count 1 has been discussed hereinabove. For the count 2 the output terminals 1 of the second and third stage remain at the higher potential whereas the output terminal 1 of the first stage is now at the lower potential, but simultaneously the output terminal 0 of stage 1 is now at the higher potential. Consequently to produce the higher potential signifying the count 2, the diodes 552, 542 and 532, whose anodes are connected to the count line 512, have their cathodes connected respectively to the lines 570, 581 and 591 respectively. It is noted from the truth table that all these lines are at the higher potential only at the count 2. The connection of the remaining diodes to the vertical lines can be determined practically by inspection from the truth table and FIG. 3, in that where for a given count there appears in the truth table the truth value T, each diode, whose anode is connected to the horizontal line associated with such given count, has its cathode connected to the output terminal number 1 of that particular stage, but has its cathode connected to the output terminal 0 of such stage where the truth value in the truth table is F. Thus the diodes whose anodes are connected to the horizontal line 518 associated with the reset count 8 or 0, namely diodes 558, 548 and 538 have their cathodes connected to the output terminals 0 of the first, second and third counter stages respectively inasmuch as the truth table indicates the truth value F for each of these stages.

The count output lines 511 to 514, which carry the counts 1 to 4 respectively as indicated by the pulse trains 127 to 130 inclusive in FIG. 8, constitute the collective output line 157 in FIG. 1 to the character and letter scanner 160 to which they are respectively connected through the interconnections 3401 to 3404 inclusive. The count output line 515 is ultimately connected through additional circuitry to the space multivibrator 172 over interconnection 2305. The line 515 together with such additional circuitry is represented by the special dot suppress line 158 in FIG. 1.

Referring to FIG. 4, the letter counter 179 is similar to the character counter 126 but as shown includes only two stages to produce a four count sequence, the first stage being generally indicated as at 592 and the second stage as at 593. The stage 592 includes the usually conducting triode 280 and the usually non-conducting triode 284 previously referred to which are connected in a flip-flop circuit substantially identical to that of the counter stages in the character counter; the second stage 593 is similarly arranged. It will be recalled that at the time D a positive voltage was applied to the grids 276 and 278 of the usually conducting tubes 280 and 282 respectively over interconnection 4602. The path from interconnection 4602 to these grids is more completely as follows: over connection 594 which corresponds to the rest input terminal R of a stage in the character counter 126, through the anode and then the cathode of a blocking diode 595, thence through a switch contact of a two-position selector switch 596 settable in the upper position to produce a three letter sequence and in the indicated lower position to produce a four letter sequence to the grid 276, and over line 597 which corresponds to the reset input terminal R of a stage in the character counter 126 to the anode and then through the cathode of a similar blocking diode 598 to the grid 278. The application of the setting voltage at the time D had set the counter 179 to the condition as shown; at the time 0 application of this voltage is discontinued as will be described more fully hereinafter, but the two stages retain their usual condition as they are stable therein. The first stage is set by application over interconnection 2402 of a pulse train which is similar to the space multivibrator train 120 in FIG. 8 except for reversal in polarity. The train is passed through connection 599 which corresponds to the set input terminal S of a stage in the character counter 126 and a differentiating condenser 600 to a junction 601 in the plate circuits of the triodes 280 and 284 which junction corresponds to the junctions 412, 429 and 444 in the character counter 126. The differentiated wave shape is indicated as at 602 in FIG. 8. As shown the initial trigger arriving at the junction point 601 at the time 6 is positive and is therefore ineffective to flip stage 592 over, whereas the second trigger arriving at the time 7+, i.e. at the termination of the pulse 122 is negative and therefore does flip the first stage.

The wave shapes produced at the anodes of the usually conducting triodes 280 and 282 are illustrated at 180 and 181 in FIG. 8 and as shown are at the lower possible potentials 182 and 183 until the times 7+ and 15+ respectively. The letter counter is somewhat dissimilar from the character counter in that the interstage coupling is from the anode of the usually conducting triode through a corresponding differentiating condenser 603 to a corresponding junction point 604; as a result the initial negative trigger is effective to flip over only the first stage instead of all the stages as in the case of the character counter 126. The differentiated wave shape produced at the junction point 604 is indicated in FIG. 8 as at 605. As shown the first trigger arriving at the junction point 604 at the time 7+ is positive and therefore produces no flipping action, whereas the second trigger arriving at the time 15+ is negative and therefore flips over the second stage.

The anodes of the usually non-conducting triodes 284 and 286 are respectively connected to voltage dividers which include in order the resistors 606 and 607 and the respectively similar resistors 608 and 609. The tap points of these voltage dividers are tied to grids of usually conducting triodes 610 and 611 respectively the cathodes of which are tied to +28 volts and the anodes of which are connected through relay coils 612 and 613 respectively to +250 volts. The triodes are usually conducting in view of the fact that their respective grids are usually at the higher of two possible potentials which is the potential of the anode of the associated usually non-conducting tube in the letter counter 179 divided down. When at the time 7+ the stage 592 is flipped the anode potential of tube 284 drops and the tube 610 is cut-off. Similarly when at the time 15+ the second stage 593 flips over the anode potential of tube 286 drops and the tube 611 is cut-off. The relays 612 and 613 are usually energized; with the alternations of states of the stages 592 and 593 they will be alternately deenergized and energized. The wave shapes 180 and 181 may also be regarded as indicative of the states of energization and deenergization of the relays 612 and 613. As illustrated in FIG. 8 for the initial letter count 0 lasting until the time 7+ both relays are energized; thereafter until the end of the count 1 which occurs at the time 15+ the relay 612 is deenergized and the relay 613 remains energized; thereafter until the termination of the letter count 2 which occurs at the time 29+ the relay 612 is energized whereas the relay 613 is deenergized; thereafter until the end of the letter count 3 and the end of the sequence which occurs at the time 32+ both relays are deenergized; thereafter they revert to the usual energized condition corresponding to the "zeroth" count in readiness for another sequence of letters.

The relays 612 and 613 constitute the character commutating means 160; more particularly they operate to provide circuit paths for the four possible intelligence character counts of one letter at a time and upon completion of such letter for the four possible intelligence character of the following letter in the sequence, etc. The succession of the counts within a given letter is inherent in view of the sequential generation of the count pulses arriving over interconnections 3401 to 3404 inclusive which as shown are connected respectively to the movable contacts 1 to 4 of the relay 612 respectively. The NO contacts 1 to 4 of relay 612 are respectively connected to the like-numbered movable contacts of the relay 613, whereas the NC contacts 1 to 4 of relay 612 are respectively connected to the movable contacts 5 to 8 of relay 613. The NO contacts 1 to 4 of relay 613 are brought out to interconnections numbered sequentially from 4501 to 4504 respectively; its NO contacts 5 to 8 are brought out to to interconnections numbered sequentially from 4511 to 4514 respectively; its NC contacts 1 to 4 are brought out to interconnections sequentially numbered 4521 to 4524 respectively; and its NC contacts 5 to 8 are brought out to interconnections sequentially numbered 4531 to 4534 respectively. The units and tens digit of the reference numeral of an interconnection connected to a stationary contact of relay 613 are intended to reflect respectively the character count transmitted over such interconnection, and the count of the letter which includes such transmitted character. For example for the "zeroth" letter count both relays 612 and 613 are energized and the four count inputs are routed from the interconnections 3401 to 3404 over the NO contacts 1 to 4 of relays 612 and 613 to interconnections 4501 to 4504 respectively. For the letter count 1 the relay 612 is deenergized and the relay 613 is energized whence the four counts are routed over the NC contacts 1 to 4 of the relay 612 and over the NO contacts 5 to 8 of the relay 613 to the interconnections 4511 to 4514 respectively. For the letter count 2 the relay 612 is energized whereas the relay 613 is deenergized whence the four counts are routed over the NO contacts 1 to 4 of relay 612 and over the NC contacts 1 to 4 of relay 613 to the interconnections 4521 to 4524 respectively and for the letter count 3 both relays 612 and 613 are deenergized whence the four counts are routed over the NC contacts 1 to 4 of relay 612 and the NC contacts 5 to 8 of relay 613 to the interconnections 4531 to 4534 respectively.

Referring to FIG. 5, the encoder or memory 159 includes a series of rotary wafer switches indicated as at 700, 710, 720 and 730, which are respectively associated with the letter counts 0, 1, 2 and 3 in the sequence, as signified by the tens digit in the respective reference numeral. Each of the switches is composed of four wafers; the wafers are identified by reference numerals whose hundreds digits is 7, whose tens digit is the same as that of the associated switch and therefore identifies the letter count associated with the particular wafer, and whose units digit identifies the character count with which the particular wafer is associated. Each wafer is provided with a plurality of angularly equi-spaced stationary contacts identified by the particular letter a character of which is encoded by the given contact. Each wafer is also provided with a rotatable contact which in its traverse engages in sequence the stationary alphabet contacts and which is connected to a slip ring which in turn continuously engages a wiper. The rotatable contact, slip ring and wiper of a given wafer are identified by a reference numeral which is the same as that of the associated wafer but is followed by the letters *a*, *b* and *c* respectively. The wiper of a given wafer is connected to that interconnection of the 4500 series which has corresponding tens and units digits in its reference numeral. For example the wiper 701*c* associated with the count 1 of the "zeroth" letter is connected to interconnection 4501. Each wafer is also provided with an outer dash return wire ring and an inner space return wire ring identified by a reference numeral which is the same as that of the associated wafer but is followed by the letters *d* and *e* respectively. The movable contacts of each switch are secured to a common shaft (not shown) for setting of the movable contacts by the instructor to the same call-letter contact in each wafer thereof in unison; this is diagrammatically represented by an interconnection which is identified by the same reference numeral as that of the associated switch but followed by the letter *a*. As shown the switches are set in order to the letters I, A, X and E for the generation of the sequence heretofore discussed.

Except for the special connections of the contact I the wafers of the switch 700 are connected in a manner which is typical for the corresponding wafers of the remaining switches. In the wafer 701 the contacts of letters having an initial dot, for example the letter A, are unconnected whereas the contacts representing letters having an initial dash, for example the letter B, are connected to the dash return ring 701*d*. The space return ring 701*e* and the corresponding space return rings for character count 1 in the remaining switches are unused but have been included for the sake of uniformity. Actually the space return rings in the wafers 721 and 731 are used, but only for the limited purpose of producing 2 letter and 1 letter sequences in a manner hereinafter described. In the wafer 702 the connection is similar in that the contacts representing letters requiring dots at count 2, for example letter B, are unconnected, and the contacts representing letters requiring dashes at count 2, for example letter A, are connected to the dash ring 702*d*. Additionally the contacts representing letters having a long space count 2, i.e. the contacts E and T are connected to the inner space return ring 702*e*. The connection of contacts in the third wafer 703 is similar to that of the wafer 702 as regards lack of connection of dot representing contacts, connection of the dash representing contacts to the dash ring 703*d* and connection of the long space count representing contacts to the space ring 703*e*. Additionally the contacts of letters having no count 3, namely the letters E and T are likewise unconnected. The connection or lack of connection of the wafer 704 follows exactly the same principle as that of the wafer 703 and therefore requires no further discussion.

The lack of connection of the I contacts in the wafers 701 and 702 is typical also for the corresponding wafers in the remaining switches, as the first two intelligence characters of the letter I are dots. The I contact of the wafers 713, 723 and 733 is connected to the appropriate space return ring as the letter I is composed of no more than two dots whereas the I contact in the wafers 714, 724 and 734 is unconnected for the very same reason. Because of the generation of a five-units-of-time long space following the second dot of the letter I in ILS transmission, the third and fourth I contacts in switch 700 are connected atypically. As shown the I contact of wafer 703 is brought out to an interconnection 2523, whereas the I contact of the wafer 704 is connected to the space return ring 704*e*. The interconnection 2523 ultimately leads to the aforementioned special monostable multivibrator 356 which is similar to the space multivibrator 172 as described hereinafter.

The dash rings of the four wafers appearing in a horizontal row, which four wafers represent like-numbered counts of the four letters in the sequence, are tied together and brought out to an interconnection; the four interconnections are numbered sequentially 2501 to 2504. The units digit is intended to correspond to the associated count number. Transmission of the dash count pulse from a given wafer through any of the three other wafers having the same character count number is inherently precluded because a contact of the relays 612 and 613 requisite for reverse transmission is open. For example a dash count pulse arriving over interconnection 4521 cannot feed through any of the interconnections 4501, 4511 and 4513, because with the transmission of the initial dash of the letter X the NO contact 1 of relay 613 which is connected to the interconnection 4501 is open, the NO contact 5 of relay 613 which is connected to interconnection 4511 is likewise open, and even though the NC contact 5 of relay 613 tied to interconnection 4531 is closed, the thereto connected NC contact 1 of the relay 612 is open. The dash returns are however isolated from one another forward of the interconnections 2501 to 2504 to prevent cross-talk at the character counter 126 as hereinafter described. Since the four wafers of a given letter are simultaneously connected to the character counter over interconnections 3401 to 3404, cross-talk would occur in the absence of such isolation.

In similar manner the space returns of the wafers representing the same count in each letter are tied together and are brought out in order to respective interconnections 2512, 2513 and 2514 for transmission ultimately to the space multivibrator 172. The lack of isolation between the wafers corresponding to same count number arises out of the same considerations as the lack of isolation in the case of the dash returns corresponding to the same count number. Similarly isolation is provided forward of the interconnections 2512 to 2514 to prevent cross-talk in the counter 126. The contacts following the Z contact in the wafers 721 and 731 are connected to their respective space rings 721*e* and 731*e*, which are tied together and brought out to an interconnection 2511 for purposes of generation of a one letter and two letter sequence respectively in the manner hereinafter described.

Referring again to FIG. 2, the interconnections 2501 to 2504 are applied to inputs of an OR gate 740, whose output is connected through a grid leak resistor 742 to ground and also through a grid current limiting resistor 744 to the grid 746 of an amplifier triode 748. The OR gate 740 is similar to the OR gate 318 except for having four rather than two inputs. It is further distinguished from gate 318 in that the capacitors, therein, such as the capacitor 750, are differentiating capacitors, rather than coupling capacitors. The diodes within the OR gate 740, such as the diode 752 perform the usual blocking function thereby precluding cross-talk at the character counter 126 as previously suggested. They perform also the additional incidental function of blocking from further transmission the resultant negative spike occurring at the end of the incoming dash count pulse. The wave shape at the output of OR gate 740 is illustrated in FIG. 8 as at 754 and as shown includes only positive trigger spikes which are produced at the commencement of the dash count pulses, namely at the times 10, 16 and 24.

The trigger spikes arriving at the grid 746 of the triode 748 from the output of the OR gate 740 are amplified by triode 748 and associated circuitry and as amplified and inverted in polarity are fed from the anode of the triode through a coupling capacitor 756 to the anode 758 of the usually nonconducting triode 760 of the dash cathode coupled monostable multivibrator 162, thereby triggering the dash multivibrator into operation to generate at the anode of the usually conducting triode 762 the dash producing bridging pulses illustrated in FIG. 8 as at 113. The pulse train 113 is fed to the input 320 of the OR gate 318 to produce the dashes as previously explained. As heretofore stated the pulses in the train 113 are of a duration greater than two units but less than three units of time long to assure the proper suppression of one short space and to preclude suppression of any part of the next short space. The grid 764 of the usually non-conducting triode 760 is connected to the wiper 766 of a potentiometer 768 to permit adjustment of the timing of the multivibrator 162. The potentiometer 768 is connected at its ends through resistors 770 and 772 respectively to +250 volts and ground to produce the proper voltage division at the grid 764.

In similar manner the interconnections 2511 to 2514 are connected to inputs of an OR gate 744 which is internally similar to the OR gate 740 especially in the respect of including differentiating capacitors and diodes which perform the dual functions of isolation of the space returns from one another and also incidentally to block the resultant negative spike at the termination of the long space count pulse. The OR gate 774 is provided with a fifth input over interconnection 2305, over which the count 5 long space count pulse, applicable to the letters having four intelligence characters, arrives. The output of the gate 774 is connected through a similar grid leak resistor 776 to ground and also through a similar grid current limiting resistor 778 to the grid 780 of a similar amplifier triode 782. The wave train appearing at the output of the gate 774 is illustrated in FIG. 8 as at 784 and as shown includes only positive triggers occurring at the commencement of the long space count pulses, namely the times 6, 14, 28 and 32. The incoming trigger spikes are amplified and inverted by the amplifier triode 782 and are applied from its anode through a similar capacitor 786 to the anode 354 of the usually non-conducting triode 268 of the space monostable cathode coupled multivibrator 172, at which anode the pulse train 120 is generated responsive to the incoming triggers. The pulse train 120 is fed over interconnection 2202 to the input 350 of the AND gate 349 to produce dot suppressing pulses. As stated except for the terminating pulse 189 these pulses are more than one unit of time long to assure dot suppression, but are less than two units of time long to avoid suppression of the following pulse in the train 112. The timing of the multivibrator 172 may be adjusted by means of a potentiometer 790 whose wiper 788 is tied to the grid 791 of the usually non-conducting triode 268. The potentiometer 790 is otherwise connected in a manner similar to that of the potentiometer 768. The anode 792 of the usually conducting triode 266 of the space multivibrator 172 produces a pulse train similar to train 120 but of opposite polarity. As shown the anode 792 is tied to interconnection 2402 to provide the advancing set pulses for the letter counter 179 as previously described. The anode 792 is also tied to an interconnection 2404 for the purpose of terminating the operation of the apparatus at the end of a complete sequence in a manner hereinafter described. The anode 792 is further tied through a coupling capacitor 794 to a junction point 796 from which there is connected a grid leak resistor 798 to ground and a grid current limiting resistor 800 to the grid 802 of an amplifier triode 804. The incoming pulse train at the grid 802 is amplified, shaped and inverted at the anode 806 of the amplifier triode 804 and as such is transmitted over interconnection 2304 to the character counter 126 to provide reset pulses therefor as previously explained. The pulse train transmitted over interconnection 2304 is substantially identical as to wave shape to that transmitted over interconnection 2202 to the AND gate 349 so that the pulse train illustrated as at 120 in FIG. 8 has been referred to as applying to both trains.

The count 3 pulse of the letter I in the case of ILS transmission is applied over interconnection 2523 to the specially provided monostable cathode coupled multivibrator 356 through circuit means substantially identical to the corresponding circuit means preceding the space multivibrator 172. Such circuit means include the differentiating capacitor 808 tied to interconnection 2523, thence through the grid leak resistor 810 to ground and through the grid current limiting resistor 812 to the grid of an amplifier triode 814 at whose anode the inverted pulse effective to trigger the multivibrator 356 are produced. The wave train produced at the grid of triode 814 is illustrated in FIG. 8 as at 816 and as shown a positive trigger is produced at the time 4 which marks the beginning of count 3 of the letter I and a negative spike is produced at the time 6 which marks the termination of the count 3. No blocking diode is necessary in the absence of other inputs to amplifier 814; the trailing edge pulse at the time 6 is of no effect on the multivibrator as it is of (negative) polarity tending to terminate the timing; this event had already occurred at the time 5+. The leading positive edge appears as inverted and amplified at the anode of the triode 814 and as such is fed through a coupling capacitor 818 to the anode of the usually non-conducting triode 355 of the multivibrator 356 thereby inducing its timing action. The output of the anode of the triode 355 is transmitted over interconnection 2204 to the input 352 of the AND gate 349 and as such is indicated in FIG. 8 as at 820; as shown it includes but a single negative pulse 822 which commences at the time 4 and terminates at the time 5+. The pulse 822 is of the same duration as the timing pulses of the multivibrator 120; although it suppresses the coinitial dot pulse 824 in the pulse train 112 to contribute to the generation of the long space 109 in pulse train 108, it is not determinative of the duration of the corresponding count pulse 826 in the pulse train 129 which terminates at the time 6 due to the arrival at the time 6 of the next dot pulse 123 in the wave train 112. The time constants of the multivibrator 356 are the same as those of the space multivibrator 172, and the grid 828 of the usually conducting triode 355 is connected over interconnection 2206 also to the wiper 788 of the potentiometer 790 to assume generation of the timing pulse 822 with the same duration as those produced by the multivibrator 172.

It will be recalled that the B+ power was supplied to the apparatus at the time D at which time also the character and letter counters had been set to the count 0 by application to their reset inputs of presetting voltages over interconnections 3602 and 4602 respectively. The presetting voltage to the character counter had been applied through the NO contact 1 of the then energized setting relay 218 to interconnection 3602. The relay 218 was deenergized shortly after the time D but the stages of the character counter 126 remained in the usual state to which they had been preset. Application of the presetting voltage for the letter counter 179 continued until the time 0 whence it was discontinued in the following chain of events; such discontinuation likewise did not change the usual state of the tubes in the letter counter.

The starting means 100 includes a cam 830 (FIG. 6) which is driven by rotary timing means in the radio navigational aid apparatus external of the keyer at a speed of approximately ⅙ r.p.s. The cam is provided with an elevation 831 whose span is approximately one tenth of the circumference of cam 830. Engagement by the elevation 831 of a cam contact 832 beginning at the time E (FIG. 7) and continuing for 0.6 second closes an energizing circuit for a start relay 833. This circuit extends from the +28 volt line through the relay coil 834, cam contact 832, interconnection 6602 and through a switch contact 835 to ground. The switch contact 835 is in the left position indicated for VOR, ILS and MARK transmission, but is in the alternate right-hand position for the low frequency AN range transmission.

Energization of relay 833 provides an alternate ground return in the energization circuit of the reset and hold relay 242 from the line 246 over line 836 and the NO contact 1 of relay 833 to ground instead of the line 248 and the NO contact 1 of the control relay 234. The control relay is deenergized because of the cut-off of its associated triode 230. Until the time D the grid 228 of this triode had been supplied by +28 volts from the +28 volt line 196 through the NO contact 2 of the setting relay 218, the diode 222, lines 224 and 226 and had further been supplied by +28 volts through resistor 298.

At the time D the setting relay 216 released whence application of +28 volts through the diode 222 ceased. With the energization of the start relay 833 at the time E, the potential at the grid 228 drops sufficiently low to cut the triode off, as the full +28 volts originally supplied through resistor 298 is now divided through resistor 298 and a resistor 837, and through the grounded NO contact 2 of relay 833. The relay 234 releases thereby returning the resistor 837 to ground additionally through the NC contact 1 of the relay 234. This assures that when the relay 833 releases just before the time 0 and 0.6 second subsequent to the time E due to disengagement of the elevation 831 and the contact 832, the relay 234 will remain deenergized. The deenergization of the relay 234 occurs at the time F and as such is indicated in the wave train 241 in FIG. 7. The delay from the time E to the time F is the sum of the pick-up time of relay 833 and the release time of the relay 234.

The interconnection 2206 which in FIG. 2 is connected to the NC contact 2 of the final output relay 370 to provide the silence intervals between intelligence characters, letters and sequences, had been grounded through the NO contact 2 of the control relay 234, the line 838 and a switch contact 839 which is in the indicated left-hand position for all modes of transmission except DME transmission, prior to the time F. With the deenergization of the control relay 234 at the time F the interconnection 2606 is grounded through the NC contact 2 of the relay instead. In the case of DME transmission 839 is placed in the alternate right position to transmit to the NC contact 2 of the final output relay 370 the required continuous audio tone from the oscillator 121 until the time F. Thereafter such transmission ceases owing to the release of relay 234.

Just before the time 0 engagement of the cam contact 832 by the elevation 831 ceases as a result of which the start relay 833 is deenergized, disconnecting the line 836 in the alternate energization circuit of the reset and hold relay 242 from ground ot deenergize also the relay 242. Application of the +28 volt inhibiting voltage to the time base multivibrator 104 and the space multivibrator 172 through the NO contacts 1 and 2 of relay 242 ceases at the time 0, and application of the presetting voltage to the letter counter 179 over interconnection 4602 also ceases due to opening of the NO contact 3 of relay 242. Such opening changes the potential at the tap 274 from a positive divided voltage to ground potential. The time base generator 104 begins to run freely as indicated by the pulse train 106 in FIG. 7.

The initial positive pulse 840 corresponding to the first intelligence character in the letter I is produced in the train 106, and is fed through the OR gate 318 to the dash mixer 119 to give rise to the corresponding pulse 842 in the train 112. With the arrival of the pulse 840 the input 316 to the OR gate 318 is placed at the higher potential, the gate is opened, the triode 332 conducts, the relay 338 is energized to place the input 348 to the AND gate 349 at the higher potential. Since the other inputs 350 and 352 are at their respective higher potentials, the gate 349 is opened, the triode 365 conducts and the final output relay 368 is also energized. An advance pulse similar to the pulse 842 but of opposite polarity is fed from the output of dash mixer 110 over interconnection 2302 to the S terminal of the first stage 390 of the character counter 126, flipping the three stages over as indicated by the coinitial pulses 843, 844 and 845 in the trains 428, 438 and 450 respectively, as a result of which the coinitial count 1 pulse 846 in the pulse train 127 is produced by counter 126. As yet none of the pulses 842, 843 and 846 "know" their prospective durations. The count pulse 846 is delivered over interconnection 3401, the NO contacts 1 of the commutator relays 612 and 613 and interconnection 4501 to the I contact of the wafer 701 and finds an open circuit there. As a result the pulse 842 and also the corresponding pulse 847 in the final output train remain dot pulses; the pulses 843 and 846 will be of dot count duration until terminated by the second positive pulse 848 in the train 112. The audio tone from oscillator 121 is keyed by the dot pulse and as such is fed over the final output line 378 to the earphones of the student pilot.

At the time 1 the free-running multivibrator terminates its positive pulse 840 and commences its negative pulse 849 in the pulse train 106. Since the input 320 of the OR gate 318 is also at the lower potential, the gate is closed, the triode 332 is cut-off, the relay 338 releases, the AND gate 349 is also closed, the output relay 370 releases and an interval of silence ensues from the time 1 to the time 2. A similar positive pulse is delivered to the S terminal of the counter stage 390 but is of course ineffective to flip over the stage or any other stage.

At the time 2 another positive pulse 850 is generated by the multivibrator 104 and gives rise to the pulse 848 in the train 112. The stage 390 of the character counter is flipped over terminating the positive pulse 843 and commencing the negative pulse 851, but the other stages of the counter are unaffected. The count 1 pulse 846 is terminated and the count 2 pulse 852 begins. It is transmitted over interconnection 3402 and the NO contacts 2 of the commutator relays 612 and 613 to the I contact of the wafer 702 where it finds an open circuit. As a result the pulse 848 and also the corresponding pulse 853 in the train 108 remain dot pulses and a dot-keyed audio tone is transmitted to the student pilot.

The pulses 850, 848 and 853 terminate at the time 3 giving rise to a time interval of silence lasting prospectively until at least the beginning of the third positive pulse 856 in the train 106, time 4, which pulse 856 gives rise to the coinitial pulse 824 in the train 112. Concurrently the negative pulse 851 in the train 428 is terminated and the positive pulse 858 therein commences. The counter stage 390 experiences its second (even-numbered) alternation whereby concurrently the second counter stage 392 is also flipped over, terminating the positive pulse 844 and commencing the negative pulse 860 in the train 438. At time 4 the count 2 pulse 852 is also terminated and the count 3 pulse 826 commences. It is transmitted over interconnection 3403, the NO contacts 3 of the commutator relays 612 and 613, interconnection 4503 to the I contact of the wafer 703, thence over interconnection 2523 to the grid of the triode 814 to trigger the special monostable multivibrator 356 which produces the coinitial dot suppressing pulse 822 lasting until the time 5+. The AND gate 349 continues to be closed until the time 5+ and there after remains closed prospectively until at least the time 6, owing to the concurrent termination of the pulse 824 in the train 112 and commencement of the space pulse 124 to the input 348 of the AND gate at the time 5. The interval of silence is thus continued prospectively at least until the time 6, at which time the fourth positive pulse 861 from the multivibrator 104 is generated to give rise to the concurrent pulse 123 in the pulse train 112. Concurrently the first stage 390 of the character counter 126 flips over again, terminating the positive pulse 858 and commencing the negative pulse 862 in the train 428. Concurrently also the count 3 pulse 826 is terminated and the count 4 pulse 864 in the train 130 commences. It is transmitted over interconnection 3404, the NO contacts 4 of the commutator relays 612 and 613, interconnection 4504 to the I contact of the wafer 704, thence over the space return interconnection 2514, through the spact OR gate 774 to the grid 780 of the triode 782, triggering the space multivibrator 172 which produces the coinitial pulse 122 which continues closure of the AND gate 349 prospectively until the time 7+ at least; the gate actually remains closed until the time 8 owing to the concurrent termination of the positive pulse 123 and the commencement of the negative pulse 125 in the pulse train 112 at the time 7. More accurately the pulse 122 is somewhat later in arriving at the AND gate 349 than the pulse 123 by microseconds as previously indicated; a microseconds pulse spanning the time interval between the leading edges of the pulses 123 and the therefrom derived pulse 122 is transmitted to the output of the gate, but the final output relay 370 does not respond to such pulse and therefore in effect suppresses it from transmission. A similar microseconds pulse, which had spanned the leading edges of the pulse 824 and the therefrom derived pulse 822 at the time 4 had been transmitted through the gate 349, but this microseconds pulse had also been in effect suppressed by the relay 370.

The interval of silence as represented by the pulse 109 in the train 108 which had begun at the time 3 is thus extended for the required five units of time until the time 8. The pulse 122 is fed over interconnection 2304 to the reset input terminals R of the character counter 126; its trailing edge resets the character counter at the time 7+. The pulses 862 and 860 are unaffected as they had been negative prior to the time 7+; however the positive pulse 845 is terminated and the negative pulse 866 in train 450 begins at the time 7+. Concurrently also the count 4 pulse 864 terminates and the reset count pulse 868 in the train 132 commences. A pulse similar to the pulse 122 but of opposite polarity is delivered from the space multivibrator 172 over interconnection 2402 to the letter counter 179; its trailing edge sets or advances the letter counter by flipping the first stage 592 over. Concurrently the commutator relay 612 is deenergized. A positive spike is delivered to the second stage 593 but of course is incapable to produce a change in state; stage 593 remains in its usual condition and the relay 613 also remains in its usual (energized) condition.

The setting pulse similar to pulse 122 but of opposite polarity is fed from the space multivibrator 172 also over interconnection 2404 to the NO contact 5 of the commutator relay 612 where it finds an open circuit. In order for a pulse arriving at the letter counter over interconnection 2404 to propagate out of the letter counter it is necessary that both commutator relays 612 and 613 be deenergized; this occurs during the transmission of the last letter in the sequence. In such case the path is from interconnection 2404 over the NC contact 5 of the commutator relay 612 and the NC contact 9 of the commutator relay 613 through interconnection 4604 ultimately to the grid 228 of the control relay tube 230. The effect of such transmission will be described hereinafter.

At the time 8 the fifth positive pulse 869 in the train 106 is delivered from the time base generator 104 to the dash mixer 110 and gives rise to the pulse 134 in the train 112 at the output thereof. The three character counter stages flip over terminating the negative pulses 862, 860 and 866 in the trains 428, 438 and 450 respectively and commencing the positive pulses 870, 872 and 874 therein. Concurrently the reset count pulse 868 is terminated and the count 1 pulse 135 commences. It is fed from the character counter 126 over interconnection 3401, the NC contact 1 of the now deenergized commutator relay 612 and the NO contact 5 of the still energized commutator relay 613, and interconnection 4511 to the A contact of the wafer 711 where it finds an open circuit. Consequently the pulse 134 in train 112 and also the concurrent dot pulse 133 at the output of the long space mixer 119 are unaffected and a dot-keyed tone is fed to the earphones. At the time 9 these pulses terminate and a short space interval of silence ensues, but no changes occur in the character counter until the time 10 when the sixth positive pulse 116 in the train 106 commences. This gives rise at the output of the dash mixer 110 to the coinitial pulse 118 in the train 112. Concurrently the positive pulse 870 in the train 428 of the first character counter stage is terminated and the negative pulse 876 commences therein. The other counter stages experience no change in state. The count 1 pulse 135 is terminated and the count 2 pulse 136 commences. It is transmitted from the character counter 126 over interconnection 3402, the NC contact 2 of relay 612 and the NO contact 6 of relay 613, and interconnection 4512 to the A contact of the wafer 712, then over the dash return interconnection 2502 through the dash OR gate 740 to trigger the dash multivibrator 162 which transmits the coinitial timing pulse 114 to the dash mixer 110, rendering its originating pulse 118 a dash pulse and also the concurrent pulse 137 in the pulse train 108 of the long space mixer 119 dash pulses. The oscillator 121 is keyed for transmission of a dash to the earphones. This also renders the count 2 pulse 136 a dash count pulse. The sixth time base generator pulse 116 terminates at the time 11 and the negative pulse 115 in the train 106 commences concurrently, but it is suppressed by the dash multivibrator pulse 114. The negative pulse 115 terminates at the time 12 at which time the seventh positive pulse 117 in the train 106 commences. The pulse 117 keeps alive the dash pulse 118 after the termination of the dash multivibrator pulse 114 at the time 12+. At the time 13 the pulse 117 in the train 106 terminates, thereby terminating the dash pulses 118 and 137. This gives rise to a silence interval lasting prospectively at least until the time 14. No changes take place in the character counter until the time 14 when the eighth positive pulse 875 in the train 106 is delivered by the time base generator 104 to the input 316 of OR gate 318. The pulse 875 gives rise to the concurrent pulse 140 in the train 112 at the output of the dash mixer 110. Concurrently the negative pulse 876 in the train 428 of the first character counter stage terminates and the positive pulse 878 therein commences, which in turn terminates the positive pulse 872 concurrently in the second counter stage and commences the negative pulse 880 therein. The count 2 pulse 136 is terminated and the count 3 pulse 138 commences. It is delivered from the character counter 126 over interconnection 3403, the NC contact 3 of the commutator relay 612 and the NO contact 7 of the commutator relay 613, and interconnection 4513 to the A contact of the wafer 713, then over the space return 2513 through the space OR gate 774 to trigger the space multivibrator 172 which produces the concurrent pulse 176 therein. The pulse 176 is fed to the input 350 of AND gate 349 to suppress from transmission to the final output the coinitial pulse 140 in the train 112 from which it was derived. Since the pulse 140 terminates at the time 15 and since the next, ninth positive pulse 881 in the train 106 of the time base generator 104 does not arrive until time 16, a long space time interval of silence ensues from the time 13 to the time 16.

The pulse 176 is transmitted from the space multivibrator 172 also over interconnection 2304 to the reset input terminals R of the character counter 126, where its trailing edge at the time 15+ resets the character counter. The positive pulses 878 and 874 in the trains 428 and 450 of the first and third counter stages terminate and the negative pulses 882 and 884 therein commence. The negative pulse 880 of the second counter stage 438 continues unaffected. The count 3 pulse 138 is terminated at the time 15+ and the reset count pulse 144 commences.

A pulse similar to the pulse 176 but of opposite, positive polarity is transmitted from the space multivibrator 172 to interconnections 2402 and 2404. Continuing its path over interconnection 2402, its trailing edge at the time 15+ flips over the first stage 592 of the letter counter 179, terminating the positive pulse 184 in the train 180 and commencing the negative pulse 185 therein. In view of the second (even-numbered) alternation of the first counter stage, the second counter stage 593 also flips over terminating the negative pulse 183 in the train 181 and commencing the positive pulse 186 therein. The letter count 1 is terminated and the letter count 2 begins tracing the positive pulse corresponding to the pulse 176 also over interconnection 2404, its further path (prior to the time 15+ is over the NC contact 5 of the relay 612 to to NO contact 9 of the relay 613 where it finds an open circuit.

At the time 16 the ninth positive pulse 881 in the train 106 is delivered from the time base generator 104 and gives rise to the coinitial pulse 464 at the output of the dash mixer 110. Concurrently the three counter stages flip over, terminating the negative pulses 882, 880 and 884 in the trains 428, 438 and 450 respectively and commencing the positive pulses 468, 472 and 476 therein. The reset count pulse 144 is terminated and the count 1 pulse 146 commences. It is delivered over interconnection 3401 to the NO contact 1 of the commutator relay 612 and the NC contact 1 of the commutator relay 613 to the X contact of the wafer 721, thence over the dash return interconnection 2501 through the dash OR gate 740 to trigger the dash multivibrator 162, which delivers the space suppressing pulse 886 in the train 113 to the dash OR gate 318, thereby rendering its originating pulse 464 and also the concurrent pulse 887 in the train 108 at the output of the long space mixer 119 dash pulses. The pulses 464 and 887 are kept alive after termination of the dot suppressing pulse 886 at the time 19+, by the tenth positive time base generator pulse 888 which commences at the time 18 and terminates at the time 19. A dash is transmitted to the earphones. The pulse 886 also renders its originating count 1 pulse 146 a dash count pulse.

At the time 19 the pulses 464 and 887 terminate resulting in a short space interval of silence until the time 20 when the eleventh positive pulse 889 in the train 106 is delivered by the free-running multivibrator 104. The arrival at the dash mixer 110 of the pulse 889 initiates the concurrent pulse 890 in the train 112 at the output thereof. Concurrently the positive pulse 468 in the train 428 of the first character counter stage is terminated and the negative pulse 477 therein commences. The count 1 pulse 146 terminates and the count 2 pulse 148 commences. It is delivered over interconnection 3402, the NO contact 2 of relay 612 and the NC contact 2 of relay 613, and interconnection 4522 to the X contact of the wafer 722 where it finds an open circuit. The pulse 890 and also the consequent pulse 892 in the train 108 at the output of the long space mixer 119 remain dot pulses . A dot-keyed tone is transmitted to the earphones which terminates at the time 21, whereafter a short space time interval of silence ensues.

At the time 22 the free-running multivibrator 104 delivers to the dash mixer 110 the twelfth positive pulse 896 which gives rise at the output of the mixer to the concurrent pulse 898. The first and second character counter stages flip over, terminating the negative pulse 477 in the train 428 and commencing the positive pulse 478 therein, and also terminating the positive pulse 472 in the train 438 and commencing the negative pulse 482 therein. The count 2 pulse 148 is terminated concurrently and the count 3 pulse 150 commences. It is delivered from the character counter 126 over interconnection 3403, the NO contact 3 of relay 612 and the NC contact 3 of relay 613, and interconnection 4523 to the X contact of the wafer 723 where it finds an open circuit. As a result the pulse 898 and also the consequent pulse 900 in the train 108 at the output of the long space mixer 119 remain dot pulses and a dot terminating at the time 23 is transmitted to the earphones, whereafter another short space time interval of silence ensues.

At the time 24 the thirteenth positive free-running multivibrator pulse 902 is delivered to the dash mixer 110 and gives rise to the coinitial pulse 904 in the train 112 at the output thereof. The first character counter stage flips over terminating the positive pulse 478 in the train 428 and commencing the negative pulse 486 therein. Concurrently the count 3 pulse 150 is terminated and the count 4 pulse 152 commences. It is delivered from the character counter 126 over interconnection 3404, the NO contact 4 of relay 612 and the NC contact 4 of relay 613, and interconnection 4524 to the X contact of the wafer 724, then over the dash return interconnection 2504 through the dash OR gate 740 to trigger the dash multivibrator 162, which delivers the pulse 906 in the train 113 to the input of the dash mixer 110 thereby rendering its originating output pulse 904 and also the consequent pulse 908 in the train 108 at the output of the long space mixer 119 dash pulses. The pulses 904 and 908 are kept alive upon termination of the space suppressing pulse 906 at the time 26+ by the arrival of the fourteenth positive free-running multivibrator pulse 910 at the time 26. A dash, which terminates at the time 27, is delivered to the earphones, whereafter a time interval of silence lasting prospectively at least until the time 28 ensues. At the time 28 the fifteenth positive time base generator pulse 912 is deliver to the dash mixer 110 and gives rise at the output thereof to the concurrent pulse 177. The three counter stages flip over; the negative pulse 486 in the train 428 terminates and the positive pulse 492 therein commences; the negative pulse 482 in the train 438 terminates and the positive pulse 496 therein commences; and the positive pulse 476 in the train 450 terminates and the negative pulse 500 therein commences. The count 4 pulse 152 terminates and the count 5 pulse 154 commences. It is delivered from the character counter 126 over interconnection 2305 through the space OR gate 774 to trigger the space multivibrator 172 which delivers over interconnection 2202 to the input 350 of the AND gate 349 to the coinitial dot suppressing pulse 178. This continues the silence interval until the time 29+, whereafter it is continued until the time 30 by the negative free-running multivibrator pulse 913 which had commenced at the time 29 and terminates at the time 30. The pulse 178 suppresses its originating pulse 177 from transmission to the final output. The pulse 178 is also transmitted from the space multivibrator 172 over interconnection 2304 to the R input terminals of the character counter 126, where its trailing edge at the time 29+ resets the character counter. The positive pulses 492 and 496 in the trains 428 and 438 respectively, terminate and the respective negative pulses 914 and 915 commence therein. The third counter stage is then in its usual condition so that it experiences no change of state. The count 5 pulse 154 terminates at the time 29+ and concurrently the reset count pulse 156 commences.

A pulse similar to the pulse 178 but of opposite, positive polarity is transmitted from space multivibrator 172 over interconnection 2402 to the set input line 599 of the first stage of the letter counter, and also over interconnection 2404 to the NO contact 5 of the relay 612 where it finds an open circuit. Its trailing edge at the time 29+ flips over the first stage 592 of the letter counter, terminating the negative pulse 185 in the train 180 and commencing the positive pulse 187 therein. The second stage 593 is unaffected. The commutator relay 612 is deenergized, whereas the commutator relay 613 remains deenergized, thereby signifying the end of the letter count 2 and commencement of the letter count 3.

At the time 30 the sixteenth positive pulse 916 of the time base generator 104 commences, giving rise to the concurrent pulse 918 in the train 112 at the output of the dash mixer 110. The three counter stages flip over, terminating the negative pulses 914, 915 and 500 in the trains 428, 438 and 450 respectively and commencing the positive pulses 920, 922 and 924 therein. The reset count pulse 156 is terminated and the count 1 pulse 926 commences at the time 30. It is delivered over interconnection 3401, the NC contact 1 of the deenergized commutator relay 612 and the NC contact 5 of the deenergized commutator relay 613 and interconnection 4531 to the E contact of the wafer 731 where it finds an open circuit. As a consequence the pulse 918 and the concurrent pulse 927 in the train 108 at the output of the long space mixer 119 remain dot pulses. A dot is transmitted to the earphones which terminates at the time 31, at which time a silence interval commences, lasting prospectively until the time 32 at least. At the time 32 the seventeenth time base generator pulse 928 commences giving rise to the concurrent pulse 930 in the train 112 at the output of the dash mixer 110. The first stage of the character counter 126 flips over terminating the positive pulse 920. The count 1 pulse 926 terminates and the count 2 pulse 142 commences. It is delivered from the character counter 126 over interconnection 3402 over the NC contact 2 of relay 612 and the NC contact 6 of relay 613, and interconnection 4532 to the E contact of wafer 732, then over the space return interconnection 2512 through the space OR gate 774 to trigger the space multivibrator 172, which delivers the pulse 189 in train 120 over interconnection 2202 to the input 350 of the AND gate 349 to suppress its originating pulse 930 thereby continuing the silence.

A pulse similar to the pulse 189 but of opposite, positive polarity is transmitted over interconnection 2404, the NC contact 5 of the commutator relay 612 and the NC contact 9 of the commutator relay 613, interconnection 4604, through a coupling capacitor 932 and line 226 to the grid 228 of the control relay tube 230, raising its potential sufficiently to render the tube 230 conducting. The control relay 234 is energized, breaking the ground return of the resistor 837 through its NC contact 1 and reestablishing +28 volts at the grid 228 thereby establishing a quasi-hold circuit for the relay. The tube 230 will remain conducting and the relay 232 will hold itself in, even after the pulse arriving over interconnection 4604 is terminated, by reason of the +28 volt bias at its grid. The reenergization of the control relay 234 is indicated in FIG. 7 shortly after the time 32, the delay being due to the finite pick-up time of the relay. Its NO contact 1 is now grounded, reconnecting the line 248 to ground thereby reenergizing the reset and hold relay 242. This event is indicated in FIG. 7 at the time 32+, the delay from the time of energization of the control relay 234 being due to the finite pick-up time of the relay 242. The NO contacts 1, 2 and 3 of relay 242 are closed once more. +28 volts is reapplied over its NO contact 1, line 251, interconnection 2602, diode 252 to the grid 254 of the normally conducting tube 256 of the time base generator 104 rendering this tube conductive once more and terminating the pulse 928 in train 106 at the time 32+. At the same time +250 volts is applied again to the NO contact 3 of relay 242, which voltage is divided down to a positive voltage at the tap 274 and as such is transmitted over interconnection 4602 through respective diodes 595 and 598 to the grids 276 and 278 of the usually conducting tubes 280 and 282 of the stages 592 and 593 of the letter counter 179 respectively, resetting the stages to the count 0 in readiness for transmission of another sequence. The relays 612 and 613 are energized once more.

Also at the time 32+, +28 volts are reapplied to the NO contact 2 of relay 242 and thence over line 260, interconnection 2604, diode 262 to the grid 264 of the usually conducting tube 266 of the space multivibrator 172, rendering the tube conducting once more and terminating the pulse 189 at the time 32+. This pulse had been transmitted to the R input terminals of the character counter 126 but had been of no effect until the time 32+, at which time its trailing positive edge resets the stages of the character counter 126. The positive pulses 922 and 924 in the trains 438 and 450 of the second and third stages are terminated; the first stage which is then delivering a lower potential at its 1 output is of course unaffected. The character counter is now ready for another sequence of call-letters.

Beginning at the time 32 a pulse similar to the pulse 189 but of opposite, positive polarity had been delivered from the space multivibrator 172 over interconnection 2304 to the letter counter 179 but had been of no effect until the time 32+. The pulse is terminated at the time 32+ along with the pulse 189 and as such would ordinarily advance the letter counter to the count 0; however this is being accomplished simultaneously by the arrival of the reset pulse over the interconnection 4602 in the manner above described. The reason for the abbreviation of the space multivibrator pulse 189 is now apparent. Were the space multivibrator pulse 189 to continue until its natural end at the time 33+, the letter counter would be advanced from the count 0 to the count 1 at the time 33+. On the other hand, the circuitry for resetting the letter counter 179 including interconnection 4602 cannot be omitted, and dependence on automatic resetting solely by the trailing edge of the pulse 189 arriving over interconnection 2402, cannot be had for reasons which will become apparent in connection with the description of the transmission of a three letter or two letter sequence.

Prior to the reenergization of the control relay 234 the NC contact 2 of the final output relay 370 had been at ground potential to effect the silence intervals between intelligence characters and the letters of the sequence. This ground potential had been transmitted over the NC contact 2 of relay 234 and interconnection 2606. Upon reenergization of the relay shortly, after the time 32, interconnection 2606 is connected to the NO contact 2 of relay 234 instead and thence over line 838 to switch contact 839. If the switch contact 839 is in the left position shown, the interconnection 2606 and therefore the final output line 378 remain grounded for silence until another sequence of letters is to be transmitted. If the switch contact 839 is in the alternate right position a continuous audio tone from the oscillator 121 is fed thereover beginning shortly after the time 32 to the final output line 378 to simulate the operation of a DME station. Inasmuch as the lot of the letter E terminated at the time 31, a silence interval precedes the DME continuous audio transmission, thus enabling the student pilot to distinguish the sequence of call letters from the DME signal. The time interval of silence or of DME continuous audio transmission continues until 6 seconds after the time F when the elevation 831 of the cam 830 closes the contact 832 once more, to commence another complete cycle of keyer operation. From such time until 0.6 second thereafter no audio tone will be transmitted to the final output line 378, even if the switch 839 is in the right DME position, because of the deenergization of the control relay 234 and the consequent grounding of its NC contact 2. At the termination of the closure of the contact 832, approximately 6 seconds subsequent to the time 0, the reset and hold relay 242 will release once more to commence another sequence of call-letters. Thus it is seen that the keyer apparatus at the termination of the sequence has been reset to readiness for transmission of another sequence of call-letters, as it had been preset when power was first turned on by the closure of the power switch 200.

In the interest of economy the presetting circuitry within the block Y in FIG. 6 may be omitted and the +250 volt terminal 294 connected directly to the line 198. In such case as power is first turned on, the setting of the character and letters counters is random in view of the stability of the flip-flop circuits in either state. As a consequence an initial false or incomplete sequence of call-letters may be produced, at the termination of which the counters are properly reset to the count 0, so that the next sequence will be correct and complete.

For the purpose of transmission of a three letter sequence, and for that matter of a two letter sequence or a one letter sequence, the selector switch 596 (FIG. 4) is set in the upper, three letter position. As a result the presetting and resetting voltage arriving from the tap 274 over interconnection 4602 is applied over the reset connection 594, diode 595 and switch contact 596 to the grid 930 of the tube 284 instead of the grid 276 of its complementary tube 280. This renders the tube 284 the usually conducting tube and also renders the relay 612 usually deenergized. The counter is thus preset and reset to the count 1 instead of the count 0. As a consequence the character count 1 pulse of the initial letter in the three letter sequence is channeled over interconnection 3401 to the NC contact 1 of relay 612 and the NO contact 5 of relay 613, and interconnection 4511 to the selected letter contact of the wafer 711 instead of over the NO contacts 1 of relays 612 and 613 to the selected letter contact of wafer 701 in the case of a four letter sequence. The character count 1 of the letter count 0 is thus by-passed, and in similar manner the remaining character counts of letter count 0 are by-passed. The initial letter count in the case of a four letter sequence has been numbered the "zeroth" count to render the numbering of the "first" count uniformly applicable to sequences of four or three letters, and for that matter of two or one letters, in accordance with the organization and functioning of the keyer apparatus.

When at the termination of the sequence the letter count advance pulse arrives from the space multivibrator 172 over interconnection 2402 it tends to advance the letter counter 179 to the count 0. However simultaneously the reset voltage is applied over interconnection 4602 tending to reset the counter to the count 1 and prevails over the advance pulse. It is for this reason that the last letter count advance pulse, and more particularly its trailing edge cannot be availed of to reset the letter counter, as aforestated.

In the case of transmission of a two letter sequence the switch 596 is placed in the upper three letter position and additionally the switch 730 is placed in the twenty-seventh position (following the letter Z) wherein the rotatable contact 731*a* engages the stationary contact 934, which is tied to the space return ring 731*e* and the space return interconnection 2511. The sequence begins much in the same manner as in the case of the transmission of three letters. The letter count 0 is by-passed; the letter counts 1 and 2 are traversed in order. At the end of the long space count of the second letter the letter counter is advanced to the count 3. This is followed by the reset count pulse and thereafter the character count 1 pulse of letter count 3. The count 1 pulse is channeled from the character counter 126 over interconnection 3401, the NO contact 1 of relay 612 and the NC contact 5 of relay 613, and interconnection 4531 to the contact 934, thence over interconnection 2511 through the space OR gate 774 to trigger the space multivibrator 172. A sequence terminating pulse similar to the pulse 189 is generated; the sequence terminates much in the same manner as in the case of the three letter sequence, but at the character count 1 as opposed to a character count of at least 2. The letter counter is reset to the count 1 in readiness for another sequence which is initiated by closure and thereafter reopening of the cam contact 832. The letter counter 179 and the commutator relays 612 and 613 are thus caused to home in past the letter count 3 on the letter count 1. Similarly as will be seen immediately hereinafter in the case of transmission of a one letter sequence the letter counter and commutator relays are caused to home in past the letter counts 2 and 3 on the letter count 1.

In the case of transmission of a one letter sequence, such as is employed in beacon or marker transmission, the switches 596 and 730 are set as in the case of two letter transmission. Additionally the switch 720 is set to the twenty-seventh position wherein the rotatable contact 721*a* engages the twenty-seventh contact 936 which, in analogously to the contact 934, is tied to its space return ring 721*e* and the space return interconnection 2511. The sequence proceeds as in the case of transmission of a two letter sequence until the character count 1 of the letter count 2 is reached. The count 1 pulse of the letter count 2 is channeled from the character counter 126 over interconnection 3401 over the NO contact 1 of relay 612 and the NC contact 1 of relay 613, and interconnection 4521 to the contact 936, thence over interconnection 2511 through the space OR gate 774 to trigger the space multivibrator 172. Multivibrator 172 at the count 1 generates a dot suppressing pulse similar to the pulse 178, at the end of which the character counter is reset and the letter counter is advanced to the count 3. Thereafter the count 1 pulse of the letter count 3 is generated and channeled in the same manner as in the case of a two letter sequence. It produces the same effects, including termination of the sequence, as in the case of transmission of a two letter sequence.

The apparatus has been described so far for the VOR, ILS, DME, MARK (marker or beacon) modes of operation. In the case of the low frequency AN range operation it is necessary to generate two complete sequences in succession prior to any prolonged time interval of silence. The call letter transmission in AN range operation is described in greater detail in Patent No. 2,494,508, granted to R. C. Dehmel on January 10, 1950. As stated therein, the letters "A" and "N" are transmitted to their respective quadrants concurrently. In the simulator the volume of the A and N transmission is controlled by the instructor in accordance with the supposed location of the simulated flight with reference to an on-course beam, at which beam the said letters A and N are received by the student pilot with equal intensity and therefore are heard as a continuous tone. Upon termination of the 30 seconds' period of transmission of A's and N's, a silence period of 0.1 second in the N quadrant and of 3.75 seconds in the A quadrant ensues. Subsequent to the 0.1 second interval of silence a sequence of station identification signals is transmitted to the N quadrants and at the intensity corresponding to the supposed location of the simulated flight, whereafter the N quadrants remain silent until 7.5 seconds subsequent to the termination of transmission of the A's and N's. Upon the termination of the transmission of the station identification sequence to the N sector, and more particularly after the 3.75 seconds time interval of silence in the A quadrants, such silence is continued for 0.1 second therein, whereafter a sequence of identification letters is transmitted to the A quadrants and at the intensity corresponding to the supposed location of the simulated flight. Thereafter a time interval of silence in the A sector follows which terminates at a time 7.5 seconds subsequent to the termination of the transmission of the A's and N's, whence the cycle of A and N transmission and identification signal transmission is repeated. The keyer includes means for generating the aforesaid effects including means described immediately hereinafter for generating two sequences of station identification call-letters in succession.

Referring to FIG. 2, the previously referred to relay 372 had been assumed to be permanently energized in the case of other than AN range transmission to transmit to the final output line 378 an audio tone which is keyed according to the station identification signals according to the energization and deenergization periods of the final output relay 370. In the case of AN range operation, the relay 372 is also energized during the 30 second transmission of A's and N's and thereafter continues to be energized for the duration of transmission of the station-identification signal to the N quadrants. Thereafter the relay 372 is deenergized to transmit over its NC contact 1 an audio tone at the selected volume applicable to the A quadrants derived from a similar oscillator 938. The representation of two oscillators 121 and 938 is for convenience in illustration; generally a single oscillator is employed and the N volume and A volume are changed simultaneously and continuously in accordance with the supposed instantaneous location of the simualted aircraft, as described in the aforesaid Patent 2,494,508.

The previously referred to relay 376 whose movable contact 1 is connected to the final output line 378 leading to the student pilot's earphones, had been assumed to be permanently deenergized in the case of transmission other than AN transmission. During the 30 second interval of transmission of A's and N's the relay is energized, whence the A and N range signals are fed to the keyer through the terminal AN and thence to the final output line 378 through the NO contact 1 of relay 376. The relays 372 and 376 are energized and deenergized by means external of the keyer which are controlled by synchronization means effective to properly time the energization and deenergization. Such means form no part of the present invention and therefore are not shown.

Referring to FIG. 6, in the case of AN operation the cam 830 is inoperative, and the selector switch 835 is set to the right AN position. During the 30 seconds' transmission of the A and N range signals the relays 372 and 376, which are also indicated in FIG. 6, are as stated both energized. A's and N's are transmitted to the final output line 378 over the NO contact 1 of the relay 376 as aforestated and the keyer apparatus is in its usual quiescent state so that the output relay 370 is likewise deenergized. The audio tone signal derived from the oscillator 121 over the NO contact 1 of relay 372 finds an open circuit at the NO contact 2 of the output relay 370. With the relays 372 and 376 both energized a pair of capacitors 940 and 942 (FIG. 6) are charging to +250 volts through a resistor 944, whose one end is connected to plates of the capacitors over the NO contacts 2 of the relays 372 and 376 respectively. The other end of resistor 944 is connected to +250 volts. The other plates of the capacitors 940 and 942 are grounded.

The grid 946 of a triode 948 is returned to ground through resistors 950 and 952. Since the cathode of tube 948 is connected to +28 volts, the grid to cathode bias is sufficiently negative to render the tube usually non-conducting. As a consequence the coil of a relay 954 through which its anode is connected to +250 volts, is usually deenergized. The cam relay 833 is also in its usual deenergized condition as its energization circuit now extends from +28 volts through the relay coil 834 and interconnection 6604 to the movable contact 1 of the deenergized relay 954, where it is open-circuited at the NC contact 1 of relay 954. Upon energization of relay 954 the energization circuit for the relay 833 is completed over the NO contact 1 of relay 954 and switch contact 835 in the right, AN position ground.

At the termination of the 30 second transmission of A's and N's the relay 376 is deenergized. Further transmission of the A's and N's is precluded due to the opening of its NO contact 1, and transmission of the station-identification letters is enabled due to the closure of its NC contact 1. The capacitor 942 discharges through the anode and then the cathode of a blocking diode 956 and resistor 952, applying initially +250 volts less the grid current drop through resistor 950 to the grid 946. The relay 954 is energized and as a consequence the cam relay 833 is also energized. The control relay 234 is deenergized owing to the energization of the cam relay in the same manner as at the time F. The reset and hold relay 242 however remains energized with the energization of the cam relay 833, as was also the case from the time F to the time 0. After some time delay the capacitor 942 has discharged sufficiently to cut the tube 946 off once more, thereby deenergizing the relay 954 and consequently also the cam relay 833. Release of the cam relay results in release of the reset and hold relay 242 to initiate transmission of a call letter-sequence with N quadrant volume as was previously the case at the time 0.

The time delay to cut-off of the tube 948 is selected with reference to the known release time of relays 376, 954, 833 and 242 to result in a commulative time delay of 0.1 second from the termination of the 30 seconds' time interval to the transmission of the initial intelligence character in the sequence, as required. Thereafter the capacitor 942 discharges completely. The sequence is terminated with the abbreviated long space count of the last letter and the consequent reenergization of the control relay 234 and of the reset and hold relay 242 in the manner previously described. Thereafter silence ensues until at 3.75 seconds after the termination of the 30 second time interval the relay 372 likewise releases. The capacitor 940 discharges through the anode and then the cathode of a similar blocking diode 958 and resistor 952, once more to turn the triode 948 on, to temporarily energize the relay 954 and the cam relay 833 and to deenergize the control relay 234. In similar manner after some time delay, which cumulated with the release time of the relays 372, 954, 833 and 242 totals 0.1 second, the capacitor 940 has discharged sufficiently to cut the tube 948 off, releasing these relays and starting another sequence of call-letters.

Referring to FIG. 2 with the deenergization of the relay 372 the audio tone with which the identification signal is now keyed is derived from the A volume oscillator 938 over the NC contact 1 of relay 372 instead of from the N volume oscillator 121 over the NO contact 1 of relay 372. As a result the station-identification signal is now delivered to the final output line 378 with the selected A volume intensity. The sequence terminates in the manner previously described. Thereafter a silence interval ensues until 7.5 seconds subsequent to the termination of the initial transmission of the A's and N's. At this time the relays 372 and 376 are energized once more, so that the A's and N's are transmitted from the AN terminal over the NO contact 1 of relay 376 to the final output line 378. The capacitors 940 and 942 charge to +250 volts once more and the operation thereafter is repeated cyclically with the repeated deenergization of the relay 376 and thereafter of relay 372.

It should be understood that the invention is not limited to the illustrative example herein described, reference being had to the appended claims rather than the aforegoing specification to determine the scope of the invention.

What is claimed is:

1. Apparatus for keying a signal generator for transmission of a station-identification call-letter sequence in Morse code, comprising square wave generating means for producing alternately a dot pulse and a short space pulse of like predetermined durations and opposite polarities, dash inserting pulse mixing means having an input connected to said square wave generating means, long space inserting pulse mixing means having an input connected to an output of said dash inserting pulse mixing means and having an output connected to said signal generator, a plurality of multi-wafer-multi-position switches each settable in its positions to encode at a set of contacts, comprising one contact in each of its wafers for any given desired letter in the alphabet, characters of the selected letter, means providing a dash output circuit for switch contacts encoding a required dash and means providing a long space output circuit for switch contacts encoding a long space, character counter means advanceable responsive to an output of said dash inserting pulse mixing means and adapted to provide at a plurality of outputs thereof sequentially the character count pulses of a selected letter, commutator means connecting said counter outputs respectively to the contacts of said selected set of one switch, dot bridging pulse generating means responsive to arrival of a dash count pulse at said dash output circuit for delivering to an input of said dash inserting pulse mixing means a pulse bridging two consecutive delivered dot pulses thereby to effect transmission of a dash to said signal generator, and first, second, and third distinct means each responsive to arrival of a long space count pulse at said space output circuit for performing respectively the three functions of delivering to said long space pulse mixing means a pulse bridging two consecutive short space pulses thereby to effect transmission of a long space to said signal generator, of resetting said character counter means to readiness for the sequence of counts for the following letter, and of advancing said commutator means to connect the outputs of said character counter means respectively to the contact of the set of said following letter.

2. Apparatus as specified in claim 1 wherein the number of wafers per switch and the number of character count outputs connectable thereto is four and with the inclusion of means for delivering from a fifth character counter output directly to the three last-named means the fifth character count pulse in the case of a letter composed of the full four intelligence characters to cause respective performance of the three functions.

3. Apparatus as specified in claim 1 wherein the last-named means includes letter counter means advanceable responsive to arrival of a long space count pulse at the space output circuit and in turn effective to advance the commutator.

4. Apparatus as specified in claim 3 with the inclusion of means usually disabling the square wave generating means thereby to preclude transmission of a sequence, starting means for periodically deactivating said disabling means to release said square wave generator means and to permit generation of a sequence, and means responsive to arrival of the long space count pulse of the finally counted letter for reactivating said disabling means.

5. Apparatus as specified in claim 4 wherein the number of switches and of letter counts is three and wherein the disabling means includes means effective on reactivation to reset the letter counter to readiness for the initial letter in the following sequence.

6. Apparatus as specified in claim 5 wherein the disabling means includes means effective on reactivation for transmitting a continuous signal representative of DME operation, and wherein the starting means is effective to provide a starting signal, and further provided with means to terminate said continuous signal at the commencement of said starting signal and means to initiate another sequence at the termination of said starting signal.

7. Apparatus as specified in claim 5 wherein the letter counter and commutator are reset to a fourth count and with the inclusion of means for transmitting to the signal generator in sequence a dot, a short space, another dot and five consecutive short spaces preceding the regular first letter in the sequence to represent ILS operation, comprising means to encode the characters of such special I including at least two circuit inputs interconnectable by said commutator respectively with the third and fourth outputs of the character counter, means effective upon arrival of a count pulse at the third of said circuit inputs to deliver to an input of the long space inserting pulse mixing means a pulse bridging the delivered short space pulse preceding the third character count and the immediately following short space pulse, the fourth of said input circuits being connected to the space output circuit.

8. Apparatus as specified in claim 1 wherein the number of switches is three and with the inclusion of means for generating a sequence of less than three letters comprising means to home the commutator in on the switch corresponding to the initial letter of the following sequence responsive to arrival at the space output circuit of the long space count pulse of the last-transmitted letter in the sequence preceding said following sequence.

9. Apparatus as specified in claim 5 wherein the next-to-last switch is provided with an additional position and the corresponding contact of its first wafer is connected to the space output circuit and is connectable by the commutator to the first character counter output, whereby a two-letter sequence may be generated.

10. Apparatus as specified in claim 5 wherein the next-to-last and last switches are each provided with an additional position and the corresponding contacts of their respective first wafers are connected to the space output circuit and are connectable sequentially by the commutator to the first character counter output, whereby a one-letter sequence may be generated.

11. Apparatus as specified in claim 3 wherein the number of switches and the number of letter counts is four.

12. Apparatus as specified in claim 4 wherein the number of switches and the number of letter counts is four and with the inclusion of means to generate sequences of four, three, two and one letters.

13. Apparatus as specified in claim 4 with the addition of means for restarting a second sequence at a predetermined short time interval subsequent to commencement of one sequence, the aforesaid starting means being effective to reinitiate cyclically said one sequence at a predetermined long time interval subsequent to commencement of the previous said one sequence, whereby AN operation is represented.

14. Apparatus for keying a signal generator for transmission of a station-identification call-letter sequence in Morse code, comprising dash inserting and long space inserting pulse coincidence circuit means each provided at respective inputs thereof with a plurality of diodes for application to said diodes of input pulse trains and producing output pulse trains responsive to respective input pulse trains; means for generating and for applying a square wave pulse train, consisting alternately of a dot pulse and a short space pulse of like predetermined finite durations and opposite polarities, to a diode input of said dash inserting coincidence circuit means; means for applying an output pulse train of said dash inserting coincidence circuit means to a diode input of said long space inserting coincidence circuit means; means for keying said signal generator with the output pulse train of said long space inserting coincidence circuit means; a plurality of multi-wafer-multiposition switches each settable in its positions to encode at a set of contacts, comprising one contact in each of its wafers for any given desired letter in the alphabet, characters of the selected letter; a third coincidence circuit means including a plurality of diodes for providing a dash output circuit for switch contacts encoding a required dash and a fourth coicidenec circuit means including a plurality of diodes for providing a long space output circuit for switch contacts encoding a long space; character counter means comprising a first cascade of binary scalers advanceable responsive to an output of said dash inserting coincidence circuit means and further comprising diode matrix means responsive to said scalers to provide at a plurality of outputs thereof sequentially the character count pulses of a selected letter; letter counter means comprising a second cascade of binary scalers and further comprising a plurality of relays operable in combinations of states of energization and de-energization responsive to said second scalers to reflect the letter counts of said sequence; means including contacts of said relays connecting said diode matrix outputs respectively to the contacts of said selected set of one switch; dot bridging monostable pulse generating means responsive to arrival of a dash count pulse at said dash output circuit for delivering to an input diode of said dash inserting coincidence circuit means a pulse bridging two consecutive delivered dot pulses thereby to effect transmission of a dash to said signal generator; a second monostable pulse generating means responsive to arrival of a long space count pulse at said space output circuit for performing the three functions of delivering to an input diode of said long space inserting coincidence circuit means a pulse bridging two consecutive short space pulses thereby to effect transmission of a long space to said signal generator, of resetting said first binary scalers to readiness for the sequence of counts for the following letter, and of advancing said second binary scalers to cause said relays to connect the outputs of said diode matrix means respectively to the contacts of the set of said following letter; circuit means including contacts of said relays responsive to that pulse of said second monostable pulse generating means which corresponds to the letter last in said sequence as counted by said letter counter, for inhibiting said square wave generating means thereby to terminate said sequence; and starting means for re-enabling said square wave generating means to commence generation of another letter sequence.

15. Apparatus for keying a signal generator for transmission of a station-identification call-letter sequence in Morse code, comprising dash inserting and long space inserting pulse coincidence circuit means for receiving input pulse trains and producing output pulse trains responsive to respective input pulse trains; means for generating and for applying a square wave pulse train, consisting alternately of a dot pulse and a short space pulse of like predetermined finite durations and opposite polarities, to an input of said dash inserting coincidence circuit means; means for applying an output pulse train of said dash inserting coincidence circuit means to an input of said long space inserting coincidence circuit means; means for keying said signal generator with the output pulse train of said long space inserting coincidence circuit means; a plurality of multiwafer-multiposition switches each settable in its positions to encode at a set of contacts, comprising one contact in each of its wafers for any given desired letter in the alphabet, characters of the selected letter; a third coincidence circuit means for providing a dash output circuit for switch contacts encoding a required dash and a fourth coincidence circuit means for providing a long space output circuit for switch contacts encoding a long space; character counter means comprising a first cascade of binary scalers advanceable responsive to an output of said dash inserting coincidence circuit means and further comprising a fifth coincidence circuit means responsive to said scalers to provide at a plurality of outputs thereof sequentially the character count pulses of a selected letter; letter counter means comprising a second cascade of binary scalers operable to reflect the letter counts of said sequence; switching means responsive to said second scalers for connecting the outputs of said fifth coincidence circuit means respectively to the contacts of said selected set of one switch; dot bridging pulse generating means responsive to arrival of a dash count pulse at said dash output circuit for delivering to an input of said dash inserting coincidence circuit means a pulse bridging two consecutive delivered dot pulses thereby to effect transmission of a dash to said signal generator; a further pulse generating means responsive to arrival of a long space count pulse at said space output circuit for performing the three functions of delivering to an input of said long space inserting coincidence circuit means a pulse bridging two consecutive short space pulses thereby to effect transmission of a long space to said signal generator, of resetting said first binary scalers to readiness for the sequence of counts for the following letter, and of advancing said second binary scalers to cause said switching means to connect the outputs of said fifth coincidence circuit means respectively to the contacts of the set of said following letter; circuit means activated by said switching means in response to that pulse of said further pulse generating means which corresponds to the letter last in said sequence as counted by said letter counter, for inhibiting said square wave generating means thereby to terminate said sequence; and starting means for reenabling said square wave generating means to commence generation of another letter sequence.

16. In an automatic electronic keyer, apparatus for generating keying signals in Morse code, comprising means for generating and transmitting a pulse train consisting of alternately an intelligence character pulse of predetermined and finite duration and of one polarity and a space character pulse of predetermined and finite duration and of opposite polarity, said intelligence character pulses being of like duration and said space character pulses being of like duration, means for deriving from each of selected ones of said transmitted pulses another pulse of predetermined and finite duration, and means for inserting each of said derived pulses into said pulse train so as to change the number of originally transmitted pulses by changing the duration of each of selected transmitted pulses to a different predetermined and finite duration and to effect ultimate transmission of dots, dashes and short and long spaces.

17. In an automatic electronic keyer, apparatus for generating keying signals in Morse code, comprising means for generating and transmitting a square wave train consisting alternately of a dot character pulse of one polarity and predetermined and finite duration, and a short space character pulse of opposite polarity and like duration, means for deriving from each of selected ones of said transmitted character pulses another pulse of predetermined and finite duration, and means for suppressing with each derived pulse a selected one of said transmitted pulses of one polarity thereby to bridge the transmitted pulses of opposite polarity adjacent to a suppressed pulse and to effect ultimate transmission of dots, dashes and short and long spaces.

18. In an automatic electronic keyer provided with an encoder for storing characters of letters in a call letter sequence, apparatus for generating Morse code keying signals comprising means for generating and transmitting a square wave train consisting alternately of a dot pulse of one polarity and predetermined and finite duration, and a short space pulse of opposite polarity and like duration, means for systematically searching said encoder for encoded dashes and long spaces, means for producing, upon finding in said encoder a required dash, a dot bridging pulse, and upon finding in said encoder a required long space, a short space bridging pulse, and means for bridging two consecutive dot pulses with a dot bridging pulse and two consecutive short space pulses with a short space bridging pulse thereby to effect ultimate transmission of dots, dashes and short and long spaces.

19. Apparatus for keying a signal generator for transmission of letters in Morse code, comprising pulse generator circuit means for generating and transmitting a pulse train consisting of alternately an intelligence character pulse of predetermined and finite duration and of one polarity and a space character pulse of predetermined and finite duration and of opposite polarity, said intelligence character pulses being of like duration and said space character pulses being of like duration, means for deriving from each of selected ones of said transmitted pulses another pulse of predetermined and finite duration, and means for inserting each of said derived pulses into said pulse train so as to change the number of originally transmitted pulses by changing the duration of each of selected transmitted pulses to a different predetermined and finite duration and to effect ultimate transmission of dots, dashes and short and long spaces to said signal generator, said inserting means including pulse mixing circuit means for mixing the originally transmitted and the derived pulses, and said deriving means comprising memory means for encoding said letters and their characters, said memory means having a plurality of encoding devices which correspond to the characters of the desired letters, the encoding devices corresponding to some of said characters and being provided with output circuitry for transmission of said derived pulses to said pulse mixing circuit means, and commutator means receiving a pulse train from one of said circuit means for sequentially scanning said memory means by distributing the pulses of the latter train among the encoding devices in character-by-character and letter-by-letter sequence.

20. Apparatus for keying a signal generator for transmission of letters in Morse code, comprising pulse generator circuit means for generating and transmitting a square wave train consisting of alternately a dot pulse of predetermined and finite duration and of one polarity and a short space pulse of like duration and of opposite polarity, means for deriving from each of selected ones of said transmitted pulses another pulse of predetermined and finite duration, and means for inserting each of said derived pulses into said pulse train so as to change the number of originally transmitted pulses by changing the duration of each of selected transmitted pulses to a different predetermined and finite duration and to effect ultimate transmission of dots, dashes and short and long spaces to said signal generator, said inserting means including pulse mixing circuit means for suppressing selected ones of the originally transmitted pulses with the derived pulses thereby to produce dashes and long spaces, and said deriving means comprising memory means for encoding said letters and their characters, said memory means having a plurality of encoding devices which correspond to the characters of the desired letters, the encoding devices corresponding to dash characters and long space characters being provided with output circuitry for transmission of said derived pulses to said pulse mixing circuit means, and commutator means receiving a pulse train from one of said circuit means for sequentially scanning said memory means by distributing the pulses of the latter train among the encoding devices in character-by-character and letter-by-letter sequence.

References Cited in the file of this patent

UNITED STATES PATENTS

| | | |
|---|---|---|
| 2,660,720 | Dehmel | Nov. 24, 1953 |
| 2,771,600 | Wright et al. | Nov. 20, 1956 |
| 2,812,509 | Phelps | Nov. 5, 1957 |
| 2,934,746 | Way Dong Woo | Apr. 26, 1960 |